US011961452B2

(12) United States Patent
Park et al.

(10) Patent No.: US 11,961,452 B2
(45) Date of Patent: Apr. 16, 2024

(54) DISPLAY DEVICE AND DISPLAY DRIVING METHOD

(71) Applicant: LG Display Co., Ltd., Seoul (KR)

(72) Inventors: Jeonghyo Park, Paju-si (KR); GeunWoo Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/204,842

(22) Filed: Jun. 1, 2023

(65) Prior Publication Data

US 2023/0410719 A1 Dec. 21, 2023

(30) Foreign Application Priority Data

Jun. 15, 2022 (KR) ........................ 10-2022-0072573

(51) Int. Cl.
*G09G 3/20* (2006.01)
*G09G 3/3233* (2016.01)

(52) U.S. Cl.
CPC ......... *G09G 3/2096* (2013.01); *G09G 3/3233* (2013.01); *G09G 2300/0842* (2013.01); *G09G 2310/0202* (2013.01); *G09G 2310/061* (2013.01); *G09G 2310/08* (2013.01); *G09G 2320/045* (2013.01)

(58) Field of Classification Search
CPC ............... G09G 3/2096; G09G 3/3233; G09G 2300/0842; G09G 2310/0202; G09G 2310/061; G09G 2310/08; G09G 2320/045
See application file for complete search history.

(56) References Cited

U.S. PATENT DOCUMENTS

2020/0082759 A1* 3/2020 Lee ...................... G09G 3/3258
2023/0047875 A1* 2/2023 An ....................... G09G 3/2096
2023/0206865 A1* 6/2023 Park ..................... G09G 3/3291
345/214

* cited by examiner

*Primary Examiner* — Abhishek Sarma
(74) *Attorney, Agent, or Firm* — Fenwick & West LLP

(57) ABSTRACT

A display device and a display driving method are disclosed. The display device includes a display panel including gate lines, data lines, and a plurality of subpixels including a plurality of driving transistors, a gate driving circuit configured to apply scan signals to the gate lines, a data driving circuit configured to convert image data into data voltages and apply the data voltages to the data lines, and a timing controller configured to compensate the data voltages applied to the plurality of driving transistors based on a real-time sensing process of characteristic values of the plurality of driving transistors, and control an application of a recovery voltage to at least one driving transistor of the plurality of driving transistors a plurality of times within a blank period of a frame period based on a reference period to reset the at least one driving transistor during the blank period.

20 Claims, 16 Drawing Sheets

DISPLAY DEVICE AND DISPLAY DRIVING METHOD

CROSS REFERENCE TO RELATED APPLICATION

This application claims priority from Republic of Korea Patent Application No. 10-2022-0072573, filed on Jun. 15, 2022, which is hereby incorporated by reference in its entirety.

BACKGROUND

1. Field of Technology

Embodiments of the present disclosure relate to a display device and a display driving method, which are capable of reducing an image error appearing at a time when a driving frequency changes and improving image quality.

2. Description of the Prior Art

As the information society develops, various demands for display devices which display images are increasing, and various types of display devices such as liquid crystal display and organic light-emitting diode display are being utilized.

Among these display devices, an organic light emitting diode (OLED) display device employs an organic light-emitting diode which emits light by itself (i.e., self-emissive) and thus has advantages in its fast response speed, contrast ratio, emission efficiency, brightness, and viewing angle.

The display device may include a light-emitting element disposed in each of a plurality of subpixels disposed in a display panel and control the light-emitting element to emit light through control of a voltage applied to the light-emitting element, thereby controlling brightness represented by each subpixel and displaying an image.

In this case, the light-emitting element and a driving transistor for controlling the light-emitting element to emit light are disposed in each subpixel defined in the display panel, and according to a driving environment of the display panel, a deviation may occur in characteristic values such as a threshold voltage or mobility of the driving transistor in each subpixel. Thus, a brightness deviation (brightness non-uniformity) between the subpixels may occur, which may degrade image quality.

For example, image data supplied to the display device may be a still image or a moving image which varies at a predetermined speed, and moving images may also correspond to various types of images such as sports images, movies, and game images.

Since a format of the image data may vary according to a type of image data, a variable refresh rate (VRR) mode in which a driving frequency varies according to the type of image data may be used.

However, when the subpixel is driven at various refresh rates by applying the VRR mode, an image error may occur at a time when the driving frequency changes, causing degradation of image quality.

SUMMARY

A display device and a display driving method are disclosed that are capable of reducing an image error appearing at a time when a driving frequency changes and improving image quality.

An aspect of the present disclosure is to provide a display device and a display driving method that are capable of reducing an image error appearing when a driving frequency is changed and improving image quality by repeatedly applying recovery voltages in a blank period.

Another aspect of the present disclosure is to provide a display device and a display driving method that are capable of reducing an image error appearing when a driving frequency is changed and improving image quality by determining a reference period of a recovery voltage which is repeatedly applied to a blank period according to an operating characteristic of a driving transistor.

Another aspect of the present disclosure is to provide a display device and a display driving method that are capable of reducing an image error appearing when a driving frequency is changed and improving image quality by applying a recovery voltage in consideration of a delay time when a data enable signal is transmitted to a display panel.

In one embodiment, a display device comprises: a display panel including a plurality of gate lines, a plurality of data lines, and a plurality of subpixels including a plurality of driving transistors; a gate driving circuit configured to apply scan signals to the plurality of gate lines; a data driving circuit configured to convert image data into data voltages and apply the data voltages to the plurality of data lines; and a timing controller configured to compensate the data voltages applied to the plurality of driving transistors based on a real-time sensing process of characteristic values of the plurality of driving transistors, and control an application of a recovery voltage to at least one driving transistor of the plurality of driving transistors a plurality of times within a blank period of a frame period based on a reference period to reset the at least one driving transistor during the blank period, the frame period including a display driving period during which the data voltages are applied and the blank period during which the data voltages are maintained.

In one embodiment, a display driving method of a display device including a display panel including a plurality of gate lines, a plurality of data lines, and a plurality of subpixels including a plurality of driving transistors, a gate driving circuit configured to apply scan signals to the plurality of gate lines, and a data driving circuit configured to convert image data into a data voltages and apply the data voltages to the plurality of data lines, the display driving method comprises: determining a reference period of a recovery voltage, the reference period indicative of a timing which the recovery voltage is applied to at least one driving transistor of the plurality of driving transistors to reset the at least one driving transistor; displaying an image on the display panel; compensating the data voltages applied to the plurality of driving transistors based on sensed characteristic values of the plurality of driving transistors within a blank period of a frame period, the frame period including a display driving period during which the data voltages are applied and the blank period during which the data voltages are maintained; and applying the recovery voltage to the at least one driving transistor a plurality of times within the blank period based on the reference period.

In one embodiment, a display device comprises: a display panel including a plurality of subpixels, a plurality of gate lines, a plurality of data lines, and a plurality of driving transistors each included in a corresponding subpixel from the plurality of subpixels; a data driving circuit configured to convert image data into data voltages and apply the data voltages to the plurality of data lines during a display driving period of a frame period that includes the display driving period and a blank period during which the data voltages are maintained; a timing controller configured to switch operation of the display device between a first driving frequency and a second driving frequency that is different from the first driving frequency, wherein a recovery voltage is applied to at least one driving transistor of the plurality of driving transistors a first plurality of times according to a predetermined timing during a first blank period of a first frame period that corresponds to the first driving frequency, and wherein the recovery voltage is applied to the at least one driving transistor a second plurality of times according to the predetermined timing during a second blank period of a second frame period that corresponds to the second driving frequency where the second blank period has a duration that is different from the first blank period.

According to the embodiments of the present disclosure, it is capable of reducing an image error appearing at a time when a driving frequency changes and improving image quality.

In addition, according to the embodiments of the present disclosure, it is capable of reducing an image error appearing when a driving frequency is changed and improving image quality by repeatedly applying recovery voltages in a blank period.

In addition, according to the embodiments of the present disclosure, it is capable of reducing an image error appearing when a driving frequency is changed and improving image quality by determining a reference period of a recovery voltage which is repeatedly applied to a blank period according to an operating characteristic of a driving transistor.

In addition, according to the embodiments of the present disclosure, it is capable of reducing an image error appearing when a driving frequency is changed and improving image quality by applying a recovery voltage in consideration of a delay time when a data enable signal is transmitted to a display panel.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
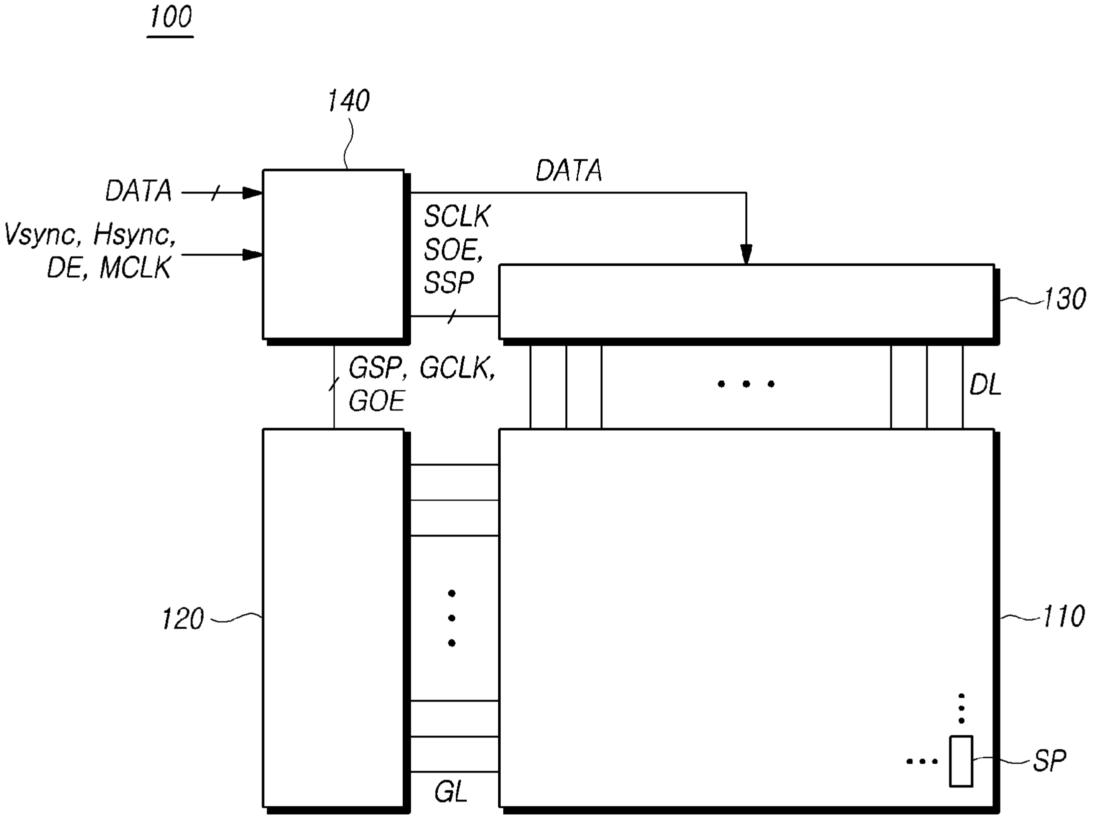
FIG. 1 is a schematic diagram illustrating a configuration of a display device according to embodiments of the present disclosure.

Hereinafter, some embodiments of the present disclosure will be described in detail with reference to exemplary drawings. In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as “including,” “having,” “containing,” “constituting,” “make up of,” and “formed of” used herein are generally intended to allow other components to be added unless the terms are used with the term “only.” As used herein, singular forms are intended to include plural forms unless the context clearly indicates otherwise.

Terms, such as “first,” “second,” “A,” “B,” “(A),” or “(B)” may be used herein to describe elements of the present disclosure. Each of these terms is not used to define essence, order, sequence, or number of elements etc., but is used merely to distinguish the corresponding element from other elements.

When it is mentioned that a first element "is connected or coupled to," "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc. each other via a fourth element. Here, the second element may be included in at least one of two or more elements that "are connected or coupled to," "contact or overlap," etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Hereinafter, various embodiments of the present disclosure will be described in detail with reference to the accompanying drawings.

FIG. 1 is a schematic diagram illustrating a configuration of a display device according to embodiments of the present disclosure.

Referring to FIG. 1, a display device 100 according to embodiments of the present disclosure may include a display panel 110 which is connected to a plurality of gate lines GL and a plurality of data lines DL and in which a plurality of subpixels SP are disposed in the form of a matrix, a gate driving circuit 120 which provides signals to the plurality of gate lines GL, a data driving circuit 130 which supplies a data voltage through the plurality of data lines DL, and a timing controller 140 for controlling the gate driving circuit 120 and the data driving circuit 130.

The display panel 110 displays an image based on scan signals transmitted from the gate driving circuit 120 through the plurality of gate lines GL and data voltages transmitted from the data driving circuit 130 through the plurality of data lines DL.

In the case of a liquid crystal display device, the display panel 110 includes a liquid crystal layer formed between two substrates and may operate in any known mode such as a twisted nematic (TN) mode, a vertical alignment (VA) mode, an in plane switching (IPS) mode, or a fringe field switching (FFS) mode. Meanwhile, in the case of an organic light-emitting display device, the display panel 110 may be implemented in a top emission method, a bottom emission method, or a dual emission method.

In the display panel 110, a plurality of pixels may be disposed in the form of a matrix. E ach pixel may be formed of subpixels SP having different colors, for example, a white subpixel, a red subpixel, a green subpixel, and a blue subpixel, and each sub-pixel SP may be defined by the plurality of data lines DL and the plurality of gate lines GL.

One subpixel SP may include a thin film transistor (TFT), a light-emitting element which emits light according to the data voltage, and a storage capacitor electrically connected to the light-emitting element to maintain a voltage, which are disposed in an area formed by one data line DL and one gate line GL.

For example, when the display device 100 having a 2,160×3,840 resolution is formed of four subpixels SP, including a white (W) subpixel, a red (R) subpixel, a green (G) subpixel, and a blue (B) sub-pixel, because there are 2,160 gate lines GL and 3,840 data lines DL connected to the four subpixels (WRGB), a total of 3,840×4=15,360 data lines DL may be provided, and the subpixels SP may be disposed in areas formed by the gate lines GL and the data lines DL.

The gate driving circuit 120 is controlled by the timing controller 140 and sequentially outputs scan signals to the plurality of gate lines GL disposed in the display panel 110 to control driving timings of the plurality of subpixels SP.

In the display device 100 having a 2,160×3,840 resolution, a case in which scan signals are sequentially output from the first gate line to the 2,160th gate line with respect to the 2,160 gate lines GL may be referred to as 2,160-phase driving. Alternatively, as in a case of sequentially outputting scan signals from the first gate line to the fourth gate line and then sequentially outputting the scan signals from the fifth gate line to the eighth gate line, a case in which scan signals are sequentially output on basis of four gate lines GL may be referred to as four-phase driving. That is, a case in which scan signals are sequentially output for every N gate lines GL may be referred to as N-phase driving.

In this case, the gate driving circuit 120 may include one or more gate driving integrated circuits GDIC, and according to a driving method, the gate driving circuit 120 may be positioned on only one side or both sides of the display panel 110. Alternatively, the gate driving circuit 120 may be directly formed in a bezel area of the display panel 110 to be implemented in the form of a gate in panel (GIP).

The data driving circuit 130 receives digital image data DATA from the timing controller 140 and converts the received digital image data DATA into an analog data voltage. Then, the data voltage is output to each data line DL according to a timing when the scan signal is applied through the gate line GL, and thus each subpixel SP connected to the data line DL displays a light emission signal with a brightness corresponding to the data voltage.

Similarly, the data driving circuit 130 may include one or more source driving integrated circuits SDIC, and the source driving integrated circuits SDIC may be connected to a bonding pad of the display panel 110 or may be directly disposed on the display panel 110 using a tape automated bonding (TAB) method or a chip on glass (COG) method.

In some cases, each source driving integrated circuit SDIC may be integrated and disposed in the display panel 110. In addition, each source driving integrated circuit SDIC may be implemented in a chip on film (COF) method. In this case, each source driving integrated circuit SDIC may be mounted on a circuit film and may be electrically connected to the data lines DL of the display panel 110 through the circuit film.

The timing controller 140 supplies various control signals to the gate driving circuit 120 and the data driving circuit 130 to control operations of the gate driving circuit 120 and the data driving circuit 130. That is, the timing controller 140 controls the gate driving circuit 120 to output a scan signal according to a timing implemented in each frame, and on the other hand, the timing controller 140 transmits digital image data DATA received from an external component to the data driving circuit 130.

In this case, in addition to the digital image data DATA, the timing controller 140 receives various timing signals including a vertical synchronization signal Vsync, a horizontal synchronization signal Hsync, a data enable signal DE, and a main clock MCLK from an external component (e.g., a host system). Accordingly, the timing controller 140 generates control signals using the various timing signals received from the external component and transmits the control signals to the gate driving circuit 120 and the data driving circuit 130.

For example, in order to control the gate driving circuit 120, the timing controller 140 outputs various gate control signals including a gate start pulse GSP, a gate clock GCLK, and a gate output enable signal GOE. Here, the gate start pulse GSP controls timings at which one or more GDICs constituting the gate driving circuit 120 start to operate. In addition, the gate clock GCLK is a clock signal commonly input to the one or more gate driving integrated circuits GDIC and controls a shift timing of the scan signal. In addition, the gate output enable signal GOE specifies timing information of the one or more gate driving integrated circuits GDIC.

In addition, in order to control the data driving circuit 130, the timing controller 140 outputs various data control signals including a source start pulse SSP, a source sampling clock SCLK, and a source output enable signal SOE. Here, the source start pulse SSP controls timings at which the one or more SDICs constituting the data driving circuit 130 start to sample data. The source sampling clock SCLK is a clock signal for controlling a timing at which the SDIC samples data (e.g., the data voltages). The source output enable signal SOE controls an output timing of the data driving circuit 130.

The display device 100 may further include a power management circuit for supplying various voltages or currents to the display panel 110, the gate driving circuit 120, or the data driving circuit 130 or controlling various voltages or various currents which are to be supplied.

Meanwhile, the light-emitting element may be disposed in each subpixel SP. For example, an organic light-emitting display device may include a light-emitting element such as a light-emitting diode at each subpixel SP and display an image by controlling a current flowing in the light-emitting element according to a data voltage.

Figure 2:
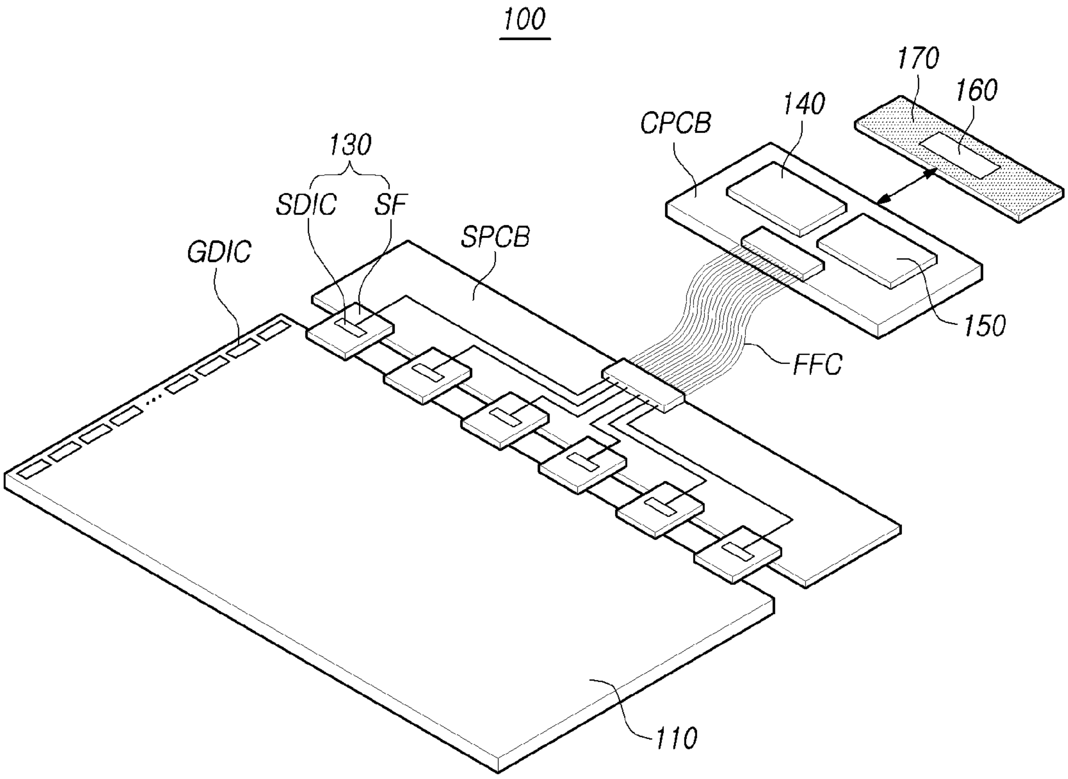
FIG. 2 is an exemplary system diagram illustrating a display device according to embodiments of the present disclosure.

FIG. 2 is an exemplary system diagram illustrating a display device according to embodiments of the present disclosure.

FIG. 2 shows the display device 100 according to embodiments of the present disclosure in which the SDICs included in the data driving circuit 130 are implemented using a COF method among various methods (TAB, COG, and COF) and the gate driving circuit 120 is implemented in the form of a GIP among various methods (TAB, COG, COF, and GIP).

When the gate driving circuit 120 is implemented in the form of a GIP, the plurality of gate driving integrated circuits GDIC included in the gate driving circuit 120 may be directly formed in a bezel area of the display panel 110. In this case, the gate driving integrated circuit GDIC may receive various signals (a clock signal, a gate high signal, and a gate low signal) required for generating a scan signal through gate driving related signal lines disposed in the bezel area.

Similarly, the one or more source driving integrated circuits SDIC included in the data driving circuit 130 may each be mounted on a source film SF, and one side of the source film SF may be electrically connected to the display panel 110. In addition, lines for electrically connecting the source driving integrated circuit SDIC to the display panel 110 may be disposed on the source film SF.

The display device 100 may include at least one source printed circuit board SPCB for electrically connecting the plurality of source driving integrated circuits SDIC to other devices, and a control printed circuit board CPCB for mounting control components and various electric devices.

In this case, one side of the source film SF on which the source driving integrated circuit SDIC is mounted may be connected to the at least one source printed circuit board SPCB. That is, the one side of the source film SF on which the source driving integrated circuit SDIC is mounted may be electrically connected to the display panel 110, and the other side thereof may be electrically connected to the source printed circuit board SPCB.

The timing controller 140 and the power management circuit 180 may be mounted on the control printed circuit board CPCB. The timing controller 140 may control operations of the data driving circuit 130 and the gate driving circuit 120. The power management circuit 180 may supply a driving voltage or current to the display panel 110, the data driving circuit 130, and the gate driving circuit 120 and control a voltage or current to be supplied.

At least one source printed circuit board SPCB and at least one control printed circuit board CPCB may be electrically connected through at least one connection member, and the connection member may be formed as, for example, a flexible printed circuit FPC, a flexible flat cable 1-1C, or the like. In addition, the at least one source printed circuit board SPCB and the at least one control printed circuit board CPCB may be implemented to be integrated into one printed circuit board.

The display device 100 may further include a set board 170 electrically connected to the control printed circuit board CPCB. In this case, the set board 170 may be referred to as a power board. A main power management circuit 160 for managing the total power of the display device 100 may be present in the set board 170. The main power management circuit 160 may interlink with the power management circuit 180.

In the case of the display device 100 having the above configuration, the driving voltage is generated from the set board 170 and transmitted to the power management circuit 180 on the control printed circuit board CPCB. The power management circuit 180 transmits a driving voltage required for driving a display or detecting a characteristic value to the source printed circuit board SPCB through the flexible printed circuit FPC or the flexible flat cable FFC. The driving voltage transmitted to the source printed circuit board SPCB is supplied through the source driving integrated circuit SDIC to drive a specific subpixel SP in the display panel 110 to emit light or to sense the specific subpixel SP.

In this case, each subpixel SP disposed in the display panel 110 of the display device 100 may include the light-emitting element and a circuit element such as a driving transistor for driving the light-emitting element.

The type and number of circuit elements constituting each subpixel SP may be variously determined according to a provided function and a design method.

Figure 3:
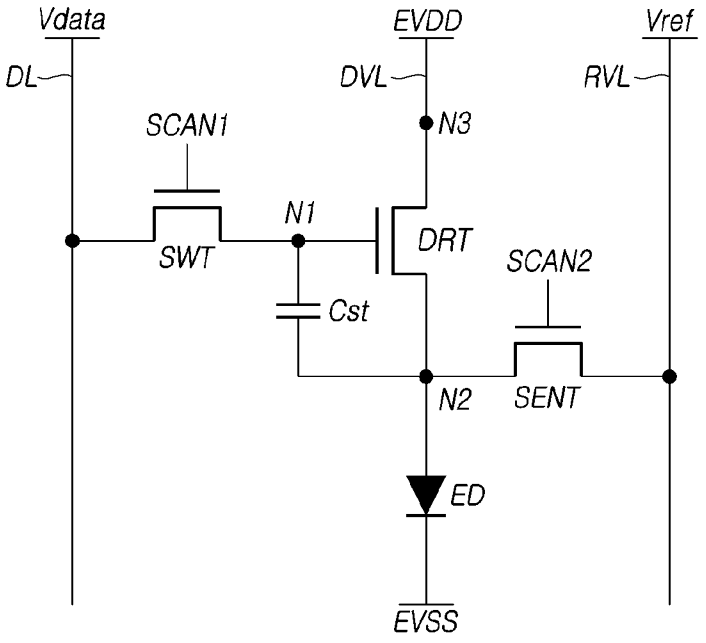
FIG. 3 is an exemplary diagram illustrating a circuit constituting a subpixel in a display device according to embodiments of the present disclosure.

FIG. 3 is an exemplary diagram illustrating a circuit constituting a subpixel in a display device according to embodiments of the present disclosure.

Referring to FIG. 3, in the display device 100 according to embodiments of the present disclosure, the subpixel SP may include one or more transistors and capacitors, and an organic light-emitting diode (OLED) may be disposed as a light-emitting element ED.

For example, the subpixel SP may include a driving transistor DRT, a switching transistor SWT, a sensing transistor SENT, a storage capacitor Cst, and the light-emitting element ED.

The driving transistor DRT has a first node N1, a second node N2, and a third node N3. The first node N1 of the driving transistor DRT may be a gate node to which a data voltage Vdata is applied from the data driving circuit 130 through the data line DL when the switching transistor SWT is turned on. The second node N2 of the driving transistor DRT may be electrically connected to an anode electrode of the light-emitting element ED and may be a source node or a drain node. The third node N3 of the driving transistor DRT is electrically connected to a driving voltage line DVL to which a driving voltage EVDD is applied and may be a drain node or a source node.

In this case, the driving voltage EVDD required for displaying an image may be supplied to the driving voltage line DVL during a display driving period. For example, the driving voltage EVDD required for displaying an image may be 27 V.

The switching transistor SWT is electrically connected between the first node N1 of the driving transistor DRT and the data line DL, and operates according to a scan signal SCAN supplied through the gate line GL being connected to the gate node. In addition, when turned on, the switching transistor SWT transmits the data voltage Vdata supplied through the data line DL to the gate node of the driving transistor DRT to control an operation of the driving transistor DRT.

The sensing transistor SENT is electrically connected between the second node N2 of the driving transistor DRT and a reference voltage line RVL, the gate line GL is connected to the gate node, and thus the sensing transistor SENT operates according to a scan signal SENSE supplied through the gate line GL. When turned on, the sensing transistor SENT transmits a sensing reference voltage Vref supplied through the reference voltage line RVL to the second node N2 of the driving transistor DRT.

That is, by controlling the switching transistor SWT and the sensing transistor SENT, a voltage of the first node N1 and a voltage of the second node N2 of the driving transistor DRT are controlled so that a current for driving the light-emitting element ED may be supplied.

The gate nodes of the switching transistor SWT and the sensing transistor SENT may be connected to one gate line GL or to different gate lines GL. Here, an example of a structure in which the switching transistor SWT and the sensing transistor SENT are connected to different gate lines GL is shown. In this case, the switching transistor SWT and the sensing transistor SENT may be independently controlled by the scan signal SCAN and the sense signal SENSE which are transmitted through the different gate lines GL.

On the other hand, when the switching transistor SWT and the sensing transistor SENT are connected to one gate line GL, the switching transistor SWT and the sensing transistor SENT may be simultaneously controlled by the scan signal SCAN or the sense signal SENSE transmitted through one gate line GL, and an aperture ratio of the subpixel SP may increase.

Meanwhile, the transistor disposed in the subpixel SP may be formed of a p-type transistor as well as an n-type transistor. Here, an example in which the transistor is formed of an n-type transistor is shown.

The storage capacitor Cst is electrically connected between the first node N1 and the second node N2 of the driving transistor DRT and maintains the data voltage Vdata for one frame.

According to a type of the driving transistor DRT, the storage capacitor Cst may be connected between the first node N1 and the third node N3 of the driving transistor DRT. The anode electrode of the light-emitting element ED may be electrically connected to the second node N2 of the driving transistor DRT, and a base voltage EVSS may be applied to a cathode electrode of the light-emitting element ED.

Here, the base voltage EVSS may be a ground voltage or a voltage that is greater or less than the ground voltage. In addition, the base voltage EVSS may vary according to a driving state. For example, a base voltage EVSS at a time of display driving and a base voltage EVSS at a time of sensing driving may be set differently.

The above-described example of the structure of the subpixel SP is a three transistor (3T)-one capacitor (1C) structure, this is merely an example for description, and the structure may additionally include one or more transistors or, in some cases, one or more capacitors. Alternatively, the plurality of sub-pixels SP may each have the same structure, or some of the plurality of sub-pixels SP may have different structures.

In order to effectively detect a characteristic value of the driving transistor DRT, for example, a threshold voltage or mobility, the display device 100 according to embodiments of the present disclosure may use a method of measuring a current flowing due to a voltage charged in the storage capacitor Cst during a characteristic value sensing period of the driving transistor DRT, and this is referred to as current sensing.

That is, by measuring the current flowing due to the voltage charged in the storage capacitor Cst during the characteristic value sensing period of the driving transistor DRT, it is possible to detect the characteristic value or a change in characteristic value of the driving transistor DRT in the subpixel SP.

In this case, since the reference voltage line RVL not only serves to transmit the reference voltage Vref, but also serves as a sensing line for sensing the characteristic value of the driving transistor DRT in the subpixel SP, the reference voltage line RVL may be referred to as a sensing line.

Figure 4:
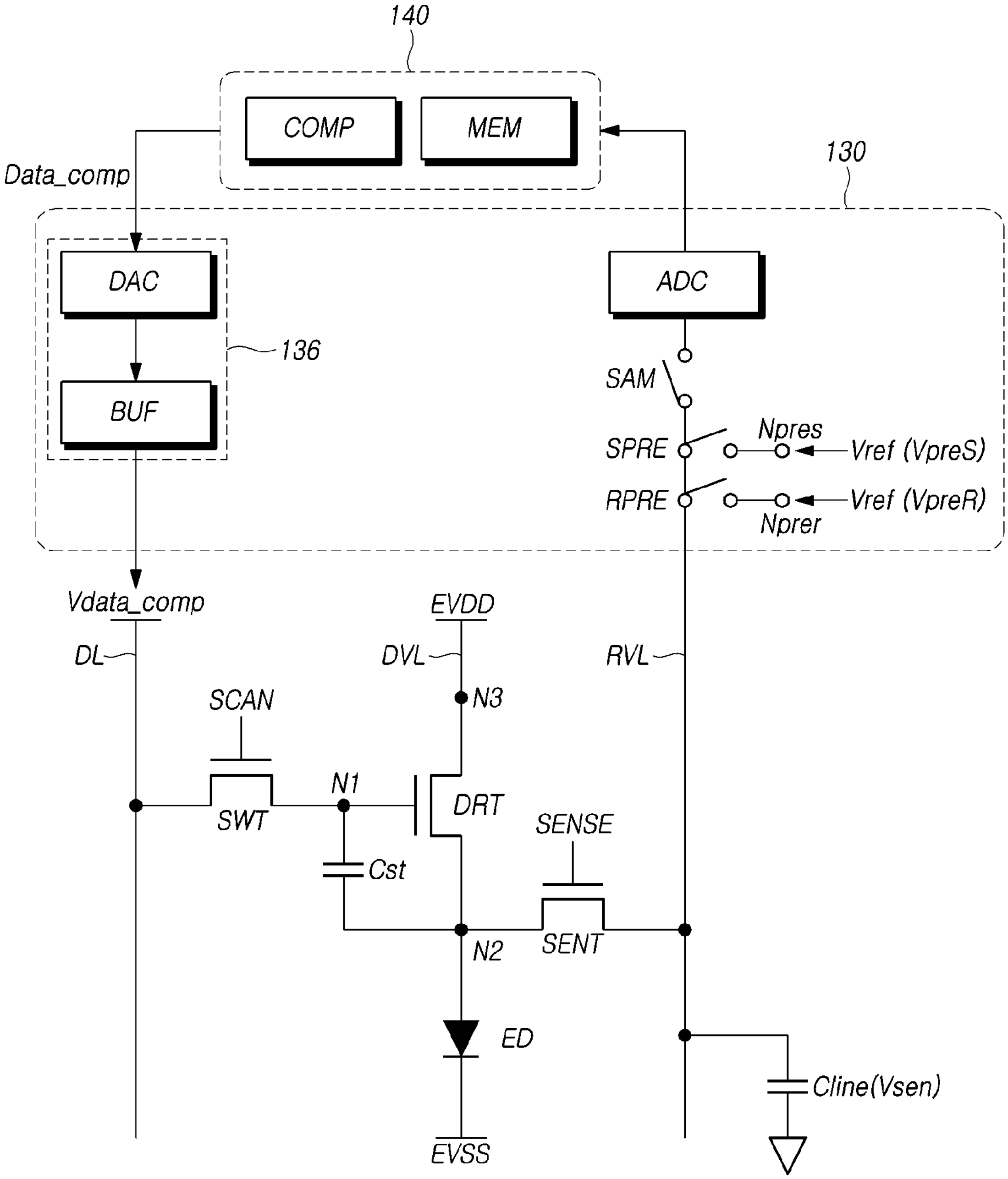
FIG. 4 is a diagram illustrating an exemplary circuit structure for sensing characteristic values of a driving transistor in a display device according to embodiments of the present disclosure.

FIG. 4 is a diagram illustrating an exemplary circuit structure for sensing characteristic values of a driving transistor in a display device according to embodiments of the present disclosure.

Referring to FIG. 4, the display device 100 according to embodiments of the present disclosure may include components for compensating data voltages due to a characteristic value deviation of the driving transistor DRT.

For example, the characteristic value or the change in characteristic value of the driving transistor DRT may be reflected as a voltage (e.g., Vdata-Vth) of the second node N2 of the driving transistor DRT. In a state in which the sensing transistor SENT is turned on, the voltage of the second node N2 of the driving transistor DRT may correspond to a voltage of the reference voltage line RVL. In addition, a line capacitor Cline of the reference voltage line RVL may be charged with the voltage of the second node N2 of the driving transistor DRT, and the reference voltage line RVL may have a voltage corresponding to the voltage of the second node N2 of the driving transistor DRT by a sensing voltage Vsen charged in the line capacitor Cline.

The display device 100 may include an analog-to-digital converter ADC for measuring the voltage of the reference voltage line RVL corresponding to the voltage of the second node N2 of the driving transistor DRT to convert the measured voltage into a digital value, and switch circuits SAM and SPRE for sensing characteristic values.

The switch circuits SAM and SPRE for controlling characteristic value sensing driving may include a sensing reference switch SPRE for controlling a connection between the reference voltage line RVL and a sensing reference voltage supply node Npres to which the reference voltage Vref is supplied, and a sampling switch SAM for controlling a connection between the reference voltage line RVL and the analog-to-digital converter ADC. Here, the sensing reference switch SPRE is a switch for controlling characteristic value sensing driving, and the reference voltage Vref supplied to the reference voltage line RVL by the sensing reference switch SPRE becomes a sensing reference voltage VpreS.

In addition, the switch circuit for sensing the characteristic value of the driving transistor DRT may include a display reference switch RPRE for controlling display driving. The display reference switch RPRE may control a connection between the reference voltage line RVL and a display reference voltage supply node Nprer to which the reference voltage Vref is supplied. The display reference switch RPRE is a switch used in display driving, and the reference voltage Vref supplied to the reference voltage line RVL by the display reference switch RPRE corresponds to a display reference voltage VpreR.

In this case, the sensing reference switch SPRE and the display reference switch RPRE may be provided separately or may be implemented to be integrated into one component. The sensing reference voltage VpreS and the display reference voltage VpreR may have the same voltage value or different voltage values.

The timing controller 140 of the display device 100 may include a memory MEM which stores data transmitted from the analog-to-digital converter ADC or pre-stores reference values, and a compensation circuit COMP for compensating the data voltage for a deviation of the characteristic values by comparing the received data with the reference value stored in the memory MEM. In this case, a compensation value calculated by the compensation circuit COMP may be stored in the memory MEM.

Thus, the timing controller 140 may compensate for image data DATA to be supplied to the data driving circuit 130 using the compensation value calculated by the compensation circuit COMP and output compensated image data DATA_comp to the data driving circuit 130. Accordingly, the data driving circuit 130 may convert the compensated image data DATA_comp into a compensated data voltage Vdata_comp in an analog form through the digital-to-analog converter DAC and output the compensated data voltage Vdata_comp to a corresponding data line DL through an output buffer BUF. Consequently, the characteristic value deviation (a threshold voltage deviation or a mobility deviation) of the driving transistor DRT in the corresponding subpixel SP may be compensated for.

As described above, a period during which the characteristic values (a threshold voltage and/or mobility) of the driving transistor DRT are sensed may proceed after a power-on signal is generated and before the display driving starts. For example, when the power-on signal is applied to the display device 100, the timing controller 140 loads parameters required for driving the display panel 110 and then performs the display driving. In this case, the parameters necessary for driving the display panel 110 may include information on the characteristic value sensing and the compensation previously performed in the display panel 110, and the characteristic values of the driving transistor DRT (the threshold voltage and the mobility) may be sensed during the parameter loading process. In this way, the process in which the characteristic value is sensed before the subpixel emits light after the power-on signal is generated is referred to as an on-sensing process.

Alternatively, the period during which the characteristic values of the driving transistor DRT are sensed may proceed after a power-off signal of the display device 100 is generated. For example, when the power-off signal is generated in the display device 100, the timing controller 140 may cut off the data voltage supplied to the display panel 110 and perform sensing of the characteristic values of the driving transistor DRT for a certain period of time. In this way, the process in which the characteristic value sensing is performed in a state in which the power-off signal is generated, the data voltage is cut off, and thus the light emission of subpixel is terminated is referred to as an off-sensing process.

In addition, the characteristic value sensing period of the driving transistor DRT may be performed in real-time during the display driving. This sensing process is referred to as a real-time (RT) sensing process. In the real-time sensing process, the sensing process may be performed for one or more subpixels SP in one or more subpixel SP lines during each blank period of the display driving period.

That is, a blank period during which the data voltage is not supplied to the subpixel SP may be present within a first frame or between an $n^{th}$ frame and an $(n+1)^{th}$ frame during the display driving period during which an image is displayed on the display panel 110, and mobility sensing for one or more subpixels SP may be performed during the blank period. In other words, the data voltage supplied to the subpixel SP is maintained during the blank period.

In this way, when the sensing process is performed during the blank period, the subpixel SP line in which the sensing process is performed may be randomly selected. In addition, after the sensing process is performed during the blank period, the compensated data voltage Vdata_comp may be supplied to the subpixel SP where the sensing process is performed during the display driving period. Thus, after the sensing process during the blank period, an abnormal phenomenon in the subpixel SP line where the sensing process is completed during the display driving period may be reduced.

Meanwhile, the data driving circuit 130 may include a data voltage output circuit 136 including a latch circuit, a digital-to-analog converter DAC, and the output buffer BUF. In some cases, the data driving circuit 130 may further include the analog-to-digital converter (ADC) and the various switches SAM, SPRE, and RPRE. Alternatively, the analog-to-digital converter (ADC) and the various switches SAM, SPRE, and RPRE may be positioned outside the data driving circuit 130.

In addition, the compensation circuit COMP may be outside the timing controller 140 or may be included inside the timing controller 140, and the memory MEM may be positioned outside the timing controller 140 or may be implemented in the form of a register inside the timing controller 140.

Figure 5:
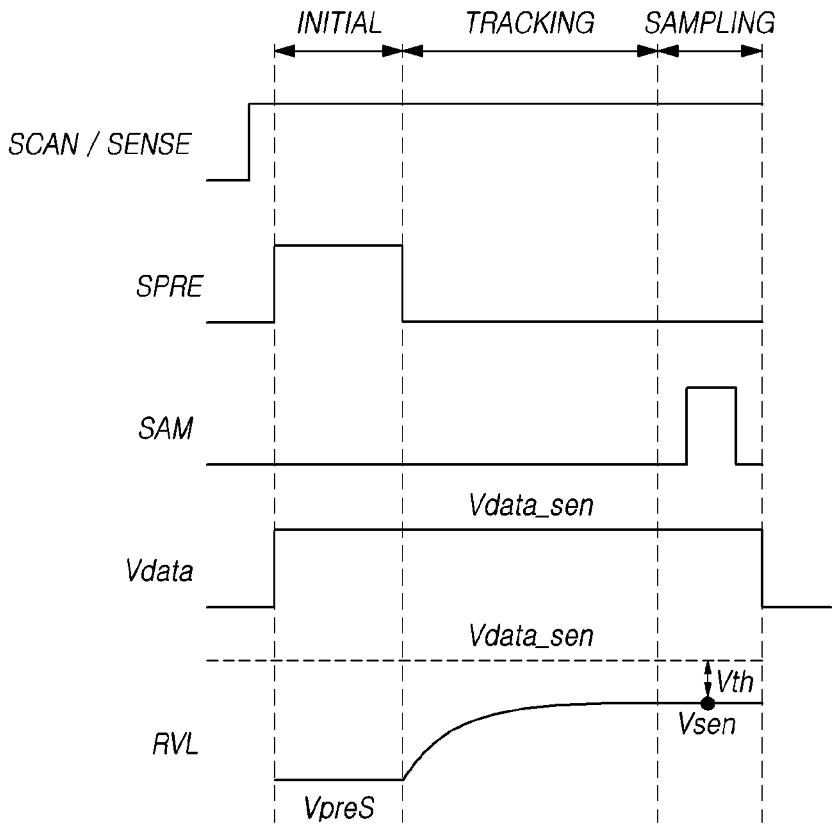
FIG. 5 is a diagram illustrating a driving timing diagram for threshold voltage sensing among characteristic values of a driving transistor in a display device according to embodiments of the present disclosure.

FIG. 5 is a diagram illustrating a driving timing diagram for threshold voltage sensing among characteristic values of a driving transistor in a display device according to embodiments of the present disclosure.

Referring to FIG. 5, in the display device 100 according to embodiments of the present disclosure, a threshold voltage sensing period Vth SENSING may include an initialization period INITIAL, a tracking period TRACKING, and a sampling period SAMPLING.

During the initialization period INITIAL, the first switching transistor SWT is turned on by a scan signal SCAN of a turn-on level. Thus, the first node N1 of the driving transistor DRT is initialized at a sensing data voltage Vdata_sen for threshold voltage sensing. The sensing data voltage Vdata_sen is a predetermined voltage in one embodiment.

In addition, during the initialization period INITIAL, the sensing transistor SENT is turned on and the sensing reference switch SPRE is turned on by a sense signal SENSE having a turn-on level voltage. Thus, the second node N2 of the driving transistor DRT is initialized at the sensing reference voltage VpreS.

The tracking period TRACKING is a period during which an operation of tracking a threshold voltage Vth of the driving transistor DRT is performed. That is, during the tracking period TRACKING, a voltage of the second node N2 of the driving transistor DRT, which reflects the threshold voltage Vth of the driving transistor DRT, is tracked.

During the tracking period TRACKING, the switching transistor SWT and the sensing transistor SENT each maintain the turn-on states, and the sensing reference switch SPRE is turned off. Thus, the state of the second node N2 of the driving transistor DRT becomes a floating state, and the voltage of the second node N2 of the driving transistor DRT starts to rise from the sensing reference voltage VpreS.

In this case, since the sensing transistor SENT is in the turn-on state, the rising of the voltage of the second node N2 of the driving transistor DRT causes a rising of the voltage of the reference voltage line RVL.

The voltage of the second node N2 of the driving transistor DRT rises and then becomes saturated. The voltage saturated at the second node N2 of the driving transistor DRT corresponds to a difference (Vdata_sen-Vth) between the sensing data voltage Vdata_sen for the threshold voltage and the threshold voltage Vth of the driving transistor DRT.

Therefore, when the voltage of the second node N2 of the driving transistor DRT is saturated, the voltage of the reference voltage line RVL corresponds to the difference (Vdata_sen-Vth) between the sensing data voltage Vdata_sen for the threshold voltage and the threshold voltage Vth of the driving transistor DRT.

When the voltage of the second node N2 of the driving transistor DRT is saturated, the sampling switch SAM is turned on, and the sampling period SAMPLING proceeds.

During the sampling period SAMPLING, the analog-to-digital converter ADC may detect the sensing voltage Vsen of the reference voltage line RVL connected by the sampling switch SAM and convert the sensing voltage Vsen into sensing data corresponding to a digital value. Here, the sensing voltage Vsen transmitted by the analog-to-digital converter ADC corresponds to "Vdata_sen-Vth."

The compensation circuit COMP may determine a threshold voltage of the driving transistor DRT positioned in the corresponding subpixel SP on the basis of the sensing data output from the analog-to-digital converter ADC, and may compensate the threshold voltage of the driving transistor DRT accordingly.

That is, the compensation circuit COMP may determine the threshold voltage Vth of the driving transistor DRT from the sensing data (the digital data corresponding to Vdata_sen-Vth) measured through the threshold voltage sensing operation and the sensing data (the digital data corresponding to Vdata_sen) for the threshold voltage.

The compensation circuit COMP may compensate for a deviation in threshold voltage between driving transistors DRT by comparing the threshold voltage Vth determined for the corresponding driving transistor DRT with a reference threshold voltage or a threshold voltage of the other driving transistor DRT. Here, the deviation compensation of the threshold voltage may be a process of changing the data voltage Vdata into the compensated data voltage Vdata_comp, that is, a process of multiplying the data voltage Vdata by a compensation gain G (e.g., Vdata_comp=G*Vdata).

Therefore, when the deviation of the threshold voltage increases, the compensation gain G multiplied to the data voltage Vdata may increase.

Figure 6:
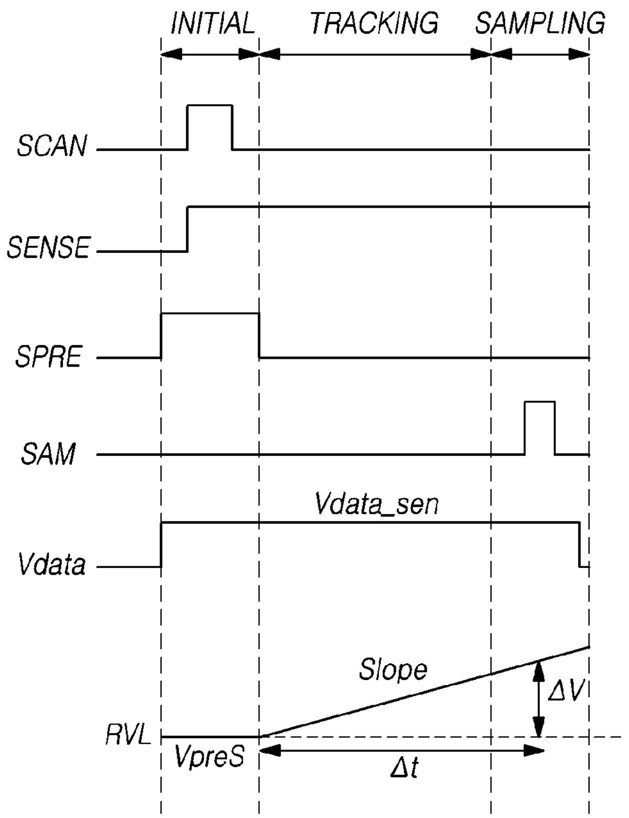
FIG. 6 is a diagram illustrating a driving timing diagram for mobility sensing among characteristic values of a driving transistor in a display device according to embodiments of the present disclosure.

FIG. 6 is a diagram illustrating a driving timing diagram for mobility sensing among characteristic values of a driving transistor in a display device according to embodiments of the present disclosure.

Referring to FIG. 6, in the display device 100 according to embodiments of the present disclosure, similar to the threshold voltage sensing operation, a mobility sensing period u SENSING of the driving transistor DRT may include an initialization period INITIAL, a tracking period TRACKING, and a sampling period SAMPLING.

Since mobility of the driving transistor DRT is generally sensed by individually turning the switching transistor SWT and the sensing transistor SENT on or off, a sensing operation may be performed with a structure in which a scan signal SCAN and a sense signal SENSE are individually applied to the switching transistor SWT and the sensing transistor SENT through two gate lines GL.

During the initialization period INITIAL, the switching transistor SWT is turned on by a scan signal SCAN of a turn-on level, and the first node N1 of the driving transistor DRT is initialized at a sensing data voltage Vdata_sen (e.g., a predetermined voltage) for mobility sensing.

In addition, the sensing transistor SENT is turned on, and the sensing reference switch SPRE is turned on by a sense signal SENSE of a turn-on level. In this state, the second node N2 of the driving transistor DRT is initialized at the sensing reference voltage VpreS.

The tracking period TRACKING is a period during which an operation of tracking the mobility of the driving transistor DRT is performed. The mobility of the driving transistor DRT may represent a current driving capability of the driving transistor DRT. During the tracking period TRACKING, a voltage of the second node N2 of the driving transistor DRT, from which the mobility of the driving transistor DRT may be calculated, is tracked.

During the tracking period TRACKING, the switching transistor SWT is turned off by the scan signal SCAN of a turn-off level, and the sensing reference switch SPRE transitions to a turn-off level. Thus, both the first node N1 and the second node N2 of the driving transistor DRT are floated, and thus both the voltages of the first node N1 and the second node N2 of the driving transistor DRT rise. In particular, since the voltage of the second node N2 of the driving transistor DRT is initialized at the sensing reference voltage VpreS, the voltage of the second node N2 starts to rise from the sensing reference voltage VpreS. In this case, since the sensing transistor SENT is in the turn-on state, the rising of the voltage of the second node N2 of the driving transistor DRT causes a rising of the voltage of the reference voltage line RVL.

During the sampling period SAMPLING, the sampling switch SAM is turned on at a time when a predetermined time $\Delta t$ elapses from a time when the voltage of the second node N2 of the driving transistor DRT starts to rise. In this case, the analog-to-digital converter ADC may detect the sensing voltage Vsen of the reference voltage line RVL connected by the sampling switch SAM and convert the sensing voltage Vsen into sensing data in the form of a digital signal. Here, the sensing voltage Vsen applied to the analog-to-digital converter ADC may correspond to a voltage of a level VpreS+$\Delta$V rising as much as a predetermined voltage $\Delta V$ from the sensing reference voltage VpreS.

The compensation circuit COMP may determine the mobility of the driving transistor DRT in the corresponding subpixel SP on the basis of the sensing data output from the analog-to-digital converter ADC and compensate for a deviation of the driving transistor DRT using the determined mobility. The compensation circuit COMP may determine the mobility of the driving transistor DRT from the sensing data VpreS+$\Delta$V measured through the mobility sensing operation, the known sensing reference voltage VpreS, and the elapsed time $\Delta t$.

That is, the mobility of the driving transistor DRT is proportional to a voltage variation $\Delta V/\Delta t$ per unit time of the reference voltage line RVL during the tracking period TRACKING and the sampling period SAMPLING, that is, a slope of a voltage waveform of the reference voltage line RVL. In this case, the compensation for mobility deviation for the driving transistor DRT may be a process of changing the data voltage Vdata, that is, an arithmetic operation of multiplying the data voltage Vdata by the compensation gain G. For example, the compensated data voltage Vdata_comp may be determined as a value obtained by multiplying the data voltage Vdata by the compensation gain G (Vdata_comp=G*Vdata).

Meanwhile, since the threshold voltage sensing operation of the driving transistor DRT may take a long time to saturate the voltage of the second node N2 of the driving transistor DRT, the threshold voltage sensing operation may be performed as the off-sensing process which may proceed for a longer time. On the other hand, since the mobility sensing operation of the driving transistor DRT may require a relatively short time compared to the threshold voltage sensing operation, the mobility sensing operation may be performed as the on-sensing process which proceeds for a short period of time or the real-time sensing process.

Meanwhile, in order to reset the driving transistor DRT after performing the characteristic value sensing operation for the driving transistor DRT, the display device 100 of the present disclosure may apply a recovery voltage within the blank period.

Figure 7:
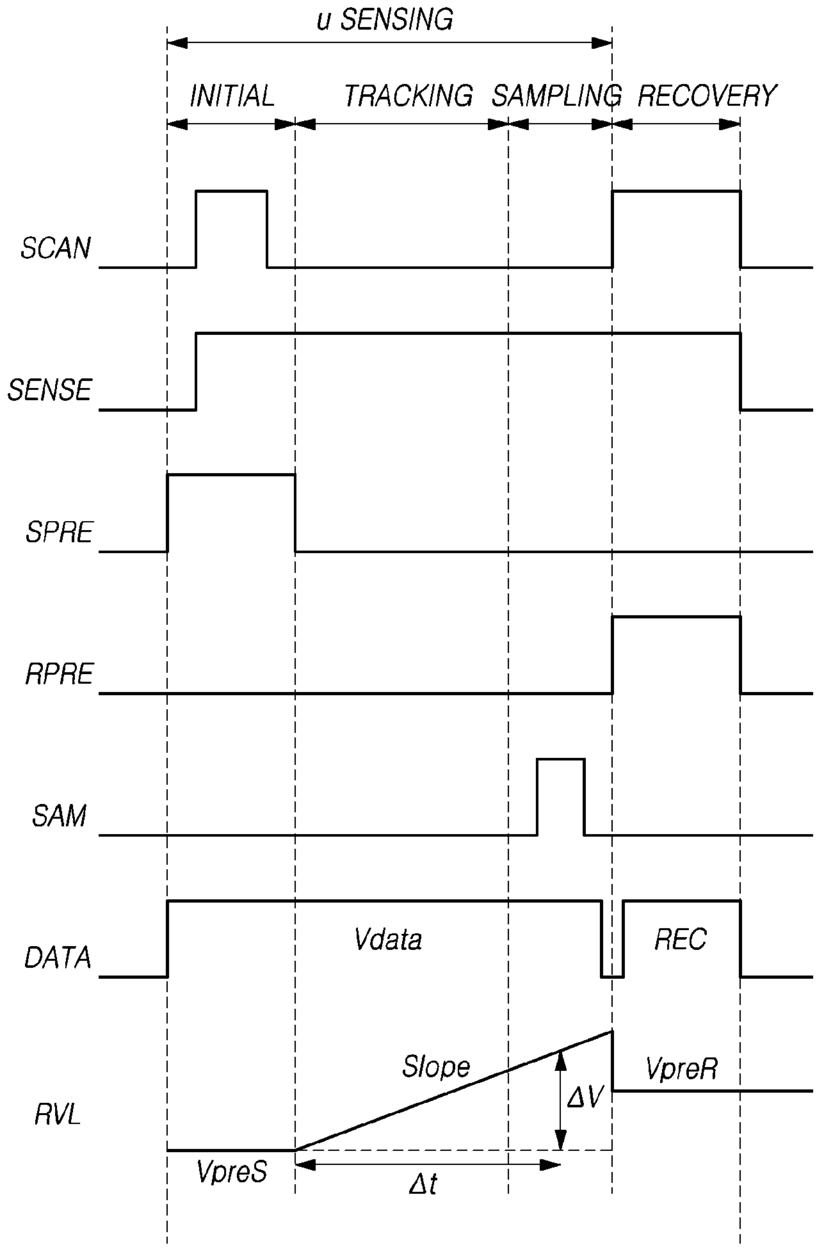
FIG. 7 is a diagram illustrating an example of a signal timing diagram for a case in which a recovery period is further included after a mobility sensing period of a driving transistor in a display device according to embodiments of the present disclosure.

FIG. 7 is a diagram illustrating an example of a signal timing diagram for a case in which a recovery period is further included after a mobility sensing period of a driving transistor in a display device according to embodiments of the present disclosure.

Referring to FIG. 7, the display device 100 according to embodiments of the present disclosure may further include a recovery period RECOVERY after the characteristic value sensing operation of a driving transistor DRT, in particular, the mobility sensing period u SENSING.

Since the mobility of the driving transistor DRT is generally sensed by individually turning the switching transistor SWT and the sensing transistor SENT on or off, a sensing operation may be performed with a structure in which a scan signal SCAN and a sense signal SENSE are applied to the switching transistor SWT and the sensing transistor SENT through two gate lines GL.

The initialization period INITIAL, the tracking period TRACKING, and the sampling period SAMPLING have been described above, and thus the descriptions thereof will be omitted.

When the voltage of the second node N2 of the driving transistor DRT is sensed during the sampling period SAMPLING, the recovery period RECOVERY may proceed. The recovery period RECOVERY may proceed during a predetermined period after the completion of the mobility sensing period u SENSING for the characteristic values of the driving transistor DRT and before the start of the display driving. That is, the recovery period RECOVERY may be regarded as a period during which a recovery voltage REC (e.g., a predetermined voltage) is applied in order to reset the voltage applied for the display driving after the characteristic value sensing operation of the driving transistor DRT. The recovery voltage REC may be applied through the reference voltage line RVL in a state in which the display reference switch RPRE is turned on.

Meanwhile, the display device 100 of the present disclosure may operate in a default mode in which the display device 100 operates at one fixed frequency and a variable refresh rate (VRR) mode in which the display device 100 operates at a plurality of variable frequencies according to a type of image data DATA input from an external host system.

Figure 8:
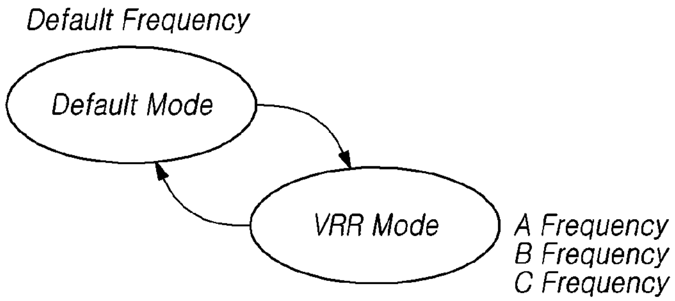
FIG. 8 is a diagram illustrating an example of a concept in which a default mode and a variable refresh rate mode are switched according to a type of image data in a display device according to embodiments of the present disclosure.

FIG. 8 is a diagram illustrating an example of a concept in which a default mode and a VRR mode are switched according to a type of image data in a display device according to embodiments of the present disclosure.

Referring to FIG. 8, the display device 100 according to embodiments of the present disclosure has a default mode in which general image data such as television (TV) images is displayed at a fixed frequency, and a VRR mode in which special image data such as game images or movies may be displayed at a plurality of variable frequencies according to a selected function.

However, the image data displayed in the default mode and the image data displayed in the VRR mode may be changed in various ways, and the image data described herein corresponds to some examples. In addition, operating modes classified according to whether a frequency displaying the image data varies may be expressed in various terms in addition to the default mode and the VRR mode.

For example, TV images may be displayed in a default mode driven by a fixed driving frequency of 120 Hz, and special images such as game images or movies may be displayed at a first frequency (e.g., A frequency) and, according to a manipulation, may be displayed at a variable frequency such as a second frequency (e.g., B frequency) or a third frequency (e.g., C frequency).

In summary, the default mode and the variable refresh rate mode may be regarded as a first operation mode and a second operation mode, respectively, according to whether a driving frequency for displaying the image data DATA on the display panel 110 is fixed or varies.

When the external host system transmits a TV image to the display device 100, the display device 100 may operate in the default mode in which the image data DATA is supplied through a fixed default frequency. When a special image such as a game image or a movie is supplied in a state in which the image data DATA is supplied at a fixed default frequency in the default mode, the host system may enter the VRR mode and supply the image data DATA while varying the driving frequency among the first frequency (A frequency), the second frequency (B frequency), and the third frequency (C frequency) according to a selected function.

Conversely, when the TV image is supplied again while operating in the VRR mode, the display device 100 may be changed to the default mode and supply the image data DATA at the fixed default frequency.

As described above, the operating mode of the display device 100 of the present disclosure may be divided into the default mode in which the display device 100 operates at the fixed default frequency and the VRR mode in which the display device 100 operates at the plurality of variable frequencies according to the type of the image data DATA supplied from the host system.

Meanwhile, in the process of changing the default mode to the VRR mode or changing the VRR rate mode to the default mode, the display device 100 of the present disclosure may supply image data of a specific brightness to the display panel 110 for a certain period of time to distinguish a mode before the change from a mode after the change.

For example, when the default mode is changed to the VRR mode, image data of A brightness may be applied to the display panel 110 for a certain period of time. Alternatively, when the VRR mode is changed to the default mode, image data of B brightness may be applied to the display panel 110 for a certain period of time.

Therefore, whether to change between the default mode and the VRR mode may be determined by detecting the brightness of the data voltage Vdata supplied from the data driving circuit 130 to the display panel 110 or by detecting brightness through a brightness detection camera.

In addition, when the driving frequency changes from the first frequency to the second frequency in the VRR mode, a range of the changed frequency may be determined by counting the number of horizontal synchronization signals during one frame period.

Figure 9:
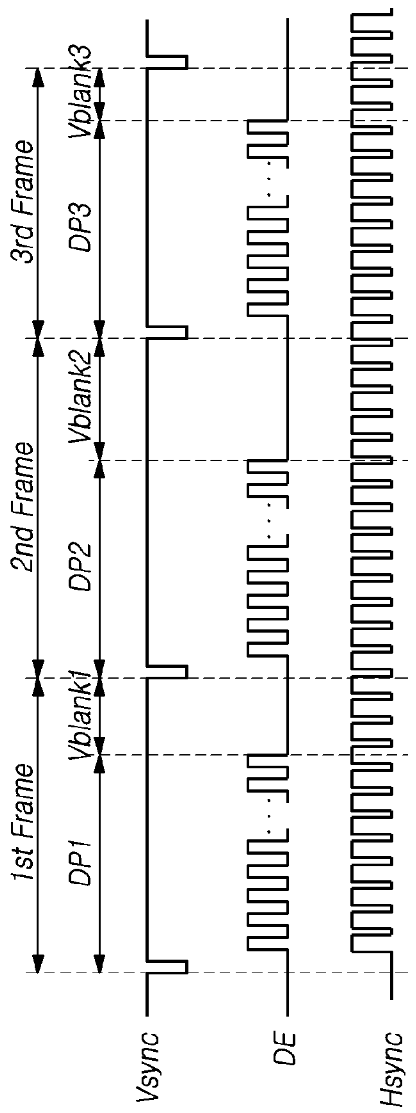
FIG. 9 is a diagram illustrating an example of signal waveforms in a variable refresh rate mode in which a vertical blank period changes according to a driving frequency in a display device according to embodiments of the present disclosure.

FIG. 9 is a diagram illustrating an example of signal waveforms in a VRR mode in which a vertical blank period is changed according to a driving frequency in a display device according to embodiments of the present disclosure.

Here, a data vertical synchronizing signal Vsync, a horizontal synchronizing signal Hsync, and an enable signal DE, which are supplied to the display device 100 from the host system, are shown.

Here, one frame may represent a time interval in which an image is output once for the entire section of the display panel 110, and specifically, one frame includes a display driving period DP in which an image is output and a vertical blank period Vblank in which an image is not output. In addition, a horizontal blank period may be included in the display driving period DP, and the horizontal blank period may be determined by the horizontal synchronization signal Hsync.

The image not being output during the vertical blank period Vblank may mean that the data enable signal DE remains at a low level so that the data voltage Vdata for implementing the image during the vertical blank period Vblank is not transmitted to the data line DL. That is, one frame may be a concept of time.

A first frame 1st Frame, a second frame 2nd Frame, and a third frame 3rd Frame indicate the order of one-frame periods. That is, the second frame 2nd Frame starts after the first frame 1st Frame, and the third frame 3rd Frame starts after the second frame 2nd Frame. Each of the first frame 1st Frame to the third frame 3rd Frame lasts for one frame period.

Here, one-frame periods of the first frame 1st Frame to the third frame 3rd Frame may be different from each other. In particular, in the first frame 1st Frame to the third frame 3rd Frame, display driving periods DP1, DP2, and DP3 may be the same, and vertical blank periods Vblank1, Vblank2, and Vblank3 may be set differently.

Referring to FIG. 9, in the display device 100 according to embodiments of the present disclosure, a first display driving period DP1 of the first frame 1st Frame, a second display driving period DP2 of the second frame 2nd Frame, and a third display driving period DP3 of the third frame 3rd Frame are the same.

On the other hand, a first vertical blank period Vblank1 of the first frame 1st Frame, a second vertical blank period Vblank2 of the second frame 2nd Frame, and a third vertical blank period Vblank3 of the third frame 3rd Frame may be set differently.

One frame period may be determined as a period between a falling time of the vertical synchronization signal Vsync and a falling time of a next vertical synchronization signal Vsync, and one frame period may be set differently for each frame.

The display driving period DP may include a plurality of horizontal periods, and one horizontal period may include a high level section of the data enable signal DE in which the image data DATA is applied and a horizontal blank period in which the image data DATA is not applied (a low level section of the data enable signal DE). In addition, the display driving period DP may include a plurality of horizontal periods corresponding to the number of gate lines GL constituting the display panel 110 and including the display driving period DP and the vertical blank period Vblank constituting one frame.

For example, when a default frequency set in the default mode is 120 Hz, the image data DATA of one frame may be repeatedly supplied 120 times for one second, and the one frame may have a time interval of 8.3 ms.

In this case, when the display panel 110 has a 2,160×3,840 resolution, 2,160 gate lines GL may be disposed in a vertical direction so that a data enable signal DE including 2,160 pulses may be applied to correspond to a time in which the 2,160 gate lines GL are turned on within one frame during the display driving period DP.

Meanwhile, although the data enable signal DE is applied in a pulse form during the display driving period DP, the data enable signal DE maintains a low level during the vertical blank period Vblank.

On the other hand, the horizontal synchronization signal Hsync may be applied in a pulse form not only during the display driving period DP but also during the vertical blank period Vblank. When a time interval of the vertical blank period Vblank varies according to the driving frequency in the VRR mode, the number of pulses of the horizontal synchronization signal Hsync included in one frame also varies. Accordingly, the driving frequency may be determined by detecting the number of pulses of the horizontal synchronization signal Hsync included in one frame. For example, the driving frequency may be determined by detecting the number of pulses of the horizontal synchronization signal Hsync included between a falling time and a next falling time of the vertical synchronization signal Vsync.

In this way, since a length of the vertical blank period Vblank changes when the operating mode changes or the driving frequency varies, a charging time due to the recovery voltage REC applied after the characteristic value sensing period is different for each driving frequency. Consequently, an image error due to a brightness deviation occurs at a time when the operating mode changes or the driving frequency varies.

Figure 10:
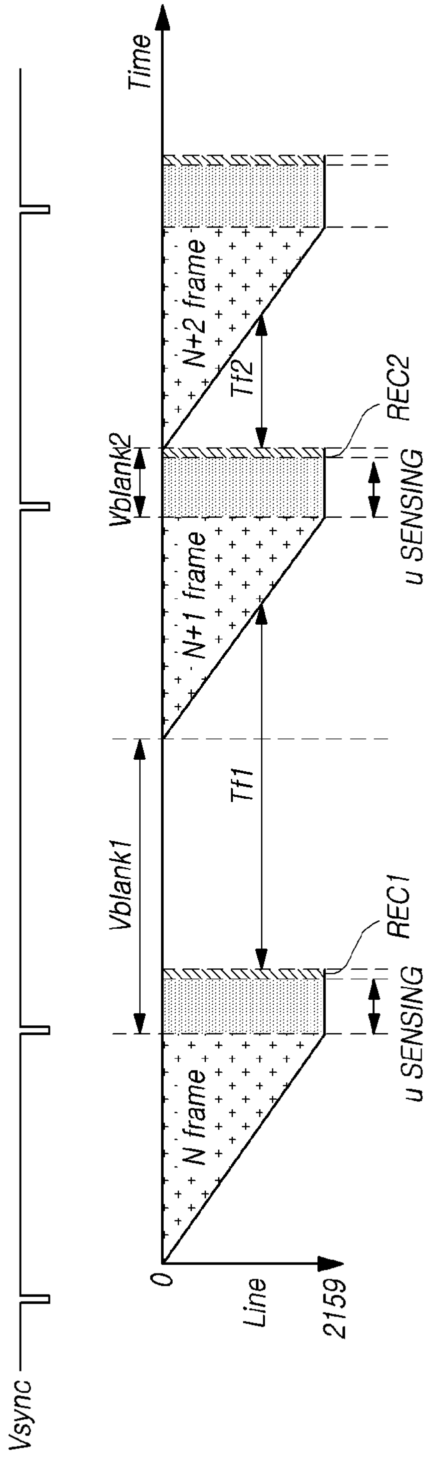
FIG. 10 is a diagram illustrating an example of a recovery voltage applied to a display panel according to a change of a driving frequency in a display device according to embodiments of the present disclosure.

FIG. 10 is a diagram illustrating an example of a recovery voltage applied to a display panel according to a change of a driving frequency in a display device according to embodiments of the present disclosure.

Referring to FIG. 10, the display device 100 according to embodiments of the present disclosure may select a subpixel SP during the vertical blank period Vblank, sense and compensate for mobility among the characteristic values of the driving transistor DRT, and apply the recovery voltage REC.

Here, the recovery period RECOVERY in which the recovery voltage REC is applied may proceed in a predetermined period after the mobility sensing period u SENSING of the driving transistor DRT is completed and before the display driving starts. That is, after the mobility sensing and compensation operation of the driving transistor DRT, the recovery voltage REC may be applied to reset the voltage applied for the display driving operation within vertical blank periods Vbglank1, Vblank2.

At this time, since the lengths of the vertical blank periods Vblank1, Vblank2 are changed when the driving frequency of the display device 100 is changed, the floating time intervals Tf1, Tf2 between a time when the recovery voltages REC1, REC2 are applied and a time when the data voltage Vdata is applied are different for each frequency.

For example, when the display device 100 operates at a driving frequency of 120 Hz in an Nth frame and operates at a driving frequency of 40 Hz in an $(N+1)^{th}$ frame, a level of the recovery voltage REC1 applied in the first vertical blank period Vblank1 driven at 40 Hz may be determined based on the previous driving frequency of 120 Hz. In addition, the subpixel SP to which the first recovery voltage REC1 is applied in the first vertical blank period Vblank1 between the Nth frame and the $(N+1)^{th}$ frame may receive the data voltage Vdata after the floating time interval Tf1 from a time when the first recovery voltage REC1 applied.

However, when the driving frequency is changed to 120 Hz again in the $(N+2)^{th}$ frame, the data voltage Vdata is applied to the corresponding subpixel SP after the second floating time interval Tf2 from the time at which the second recovery voltage REC2 is applied.

At this time, since the first floating time interval Tf1 is different from the second floating time interval Tf2 according to the driving frequencies, an image error due to luminance deviation may occur whenever the driving frequency is changed.

The display device 100 of the present disclosure repeatedly applies the recovery voltage REC at regular intervals within the vertical blank period Vblank, so that it is possible to reduce the deviation of the floating time interval Tf between a time at which the recovery voltage REC is applied and a time at which the data voltage Vdata is applied, and improve image quality by reducing image errors.

Figure 11:
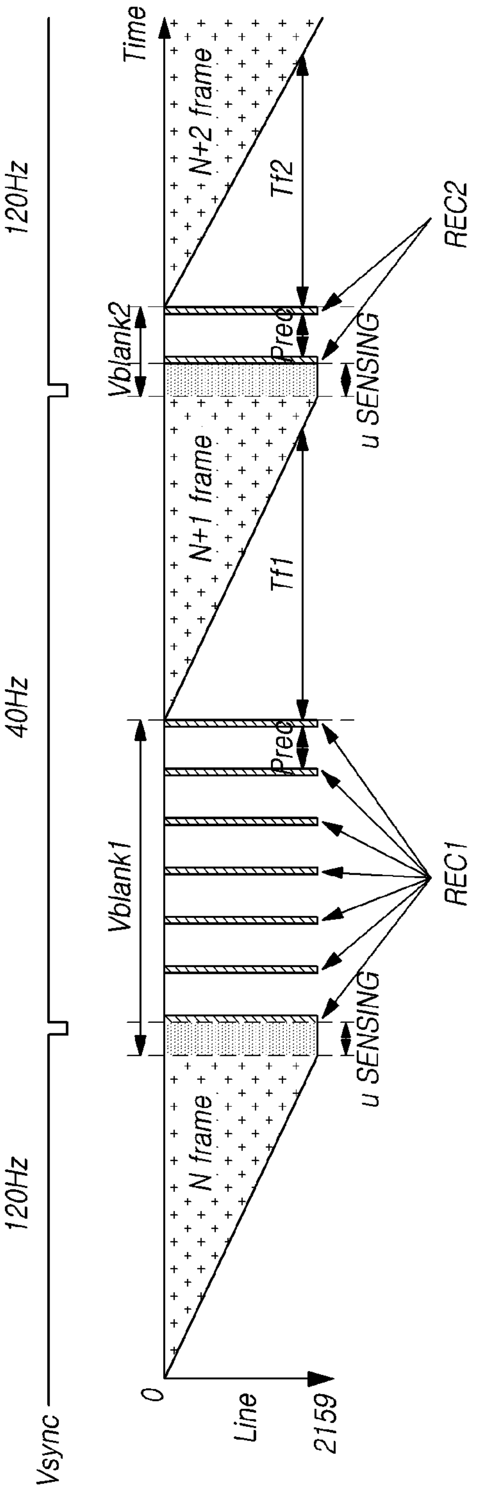
FIG. 11 is a diagram illustrating a case in which a recovery voltage is repeatedly applied to a vertical blank period in a display device according to embodiments of the present disclosure.

FIG. 11 is a diagram illustrating a case in which a recovery voltage is repeatedly applied (e.g., applied a plurality of times) during a vertical blank period in a display device according to embodiments of the present disclosure.

Referring to FIG. 11, the display device 100 according to embodiments of the present disclosure may sense and compensate mobility among the characteristic values of the driving transistor DRT by selecting an arbitrary subpixel SP and then apply recovery voltages REC1, REC2 repeatedly within the vertical blank intervals Vblank1, Vblank2. That is, the recovery voltages are applied a plurality of times until the completion of the vertical blank period. As shown in FIG. 11, the recovery voltage REC1 is applied a first number of times (e.g., 7 times) during the vertical blank interval Vblank 1 and the recovery voltage REC2 is applied a second number of times (e.g., 2 times) during the vertical blank interval Vblank 2.

Here, the recovery period RECOVERY, in which the recovery voltages REC1 and REC2 are repeatedly applied, may correspond to a certain period between a time at which the mobility sensing period u SENSING of the driving transistor DRT is completed and a time at which the data voltage Vdata is applied to the corresponding subpixel SP. That is, after the mobility sensing and compensating operation of the driving transistor DRT, the recovery voltages REC1, REC2 may be repeatedly applied according to a reference period Prec in order to reset a voltage applied to the corresponding subpixel SP within the vertical blank intervals Vblank1, Vblank2. That is the recovery voltage is applied after elapsing of the reference period Prec from a previous application of the recovery voltage.

At this time, the recovery voltages REC1, REC2 may be repeatedly applied to the subpixel SP until the end point of the vertical blank intervals Vblank1, Vblank2. Therefore, even if the lengths of the vertical blank periods Vblank1, Vblank2 are different due to the variation of the driving frequency of the display device 100, the floating time intervals Tf1, Tf2 between a time at which the last recovery voltages REC1, REC2 are applied within the vertical blank periods Vblank1, Vblank2 and a time at which the data voltage Vdata is applied may be maintained substantially the same.

For example, when the operation of the display device 100 is changed to a driving frequency of 40 Hz in $(N+1)^{th}$ frame from a driving frequency of 120 Hz in Nth frame, the recovery voltage REC1 during a first vertical blank period Vblank1 operating at 40 Hz may be repeatedly applied based on the reference period Prec. Accordingly, the subpixel SP to which the first recovery voltage REC1 is applied within the first vertical blank period Vblank1 between the Nth frame and the $(N+1)^{th}$ frame receives the data voltage Vdata after the first floating time interval Tf1 from the time at which the first recovery voltage REC1 is finally applied.

After that, when the driving frequency is changed to 120 Hz again in the $(N+2)^{th}$ frame, the corresponding subpixel SP may repeatedly receive the second recovery voltage REC2 during the second vertical blank period Vblank2 based on the reference period Prec. Accordingly, the subpixel SP to which the second recovery voltage REC2 is applied within the second vertical blank period Vblank2 between the $(N+1)^{th}$ frame and the $(N+2)^{th}$ frame receives the data voltage Vdata after the second floating time interval Tf2 from the time at when the second recovery voltage REC2 is finally applied to.

At this time, the time at which the first recovery voltage REC1 is finally applied within the first vertical blank period Vblank1 is close to the time at which the first vertical blank period Vblank1 ends. In addition, the time at which the second recovery voltage REC2 is finally applied within the second vertical blank period Vblank2 is close to the time at which the second vertical blank period Vblank2 ends.

Therefore, the first floating time interval Tf1 between the time at which the first recovery voltage REC1 is applied for a last time during the first vertical blank period Vblank1 and the time at which the data voltage Vdata is applied, and the second floating time interval Tf2 between the time at which the second recovery voltage REC2 is applied for a last time during the second vertical blank period Vblank2 and the time at which the data voltage Vdata is applied, may be maintained at the same level. As a result, even if the driving frequency of the display device 100 is changed, image errors due to luminance deviation may be reduced since the floating time interval Tf for each subpixel SP is maintained constant.

Figure 12:
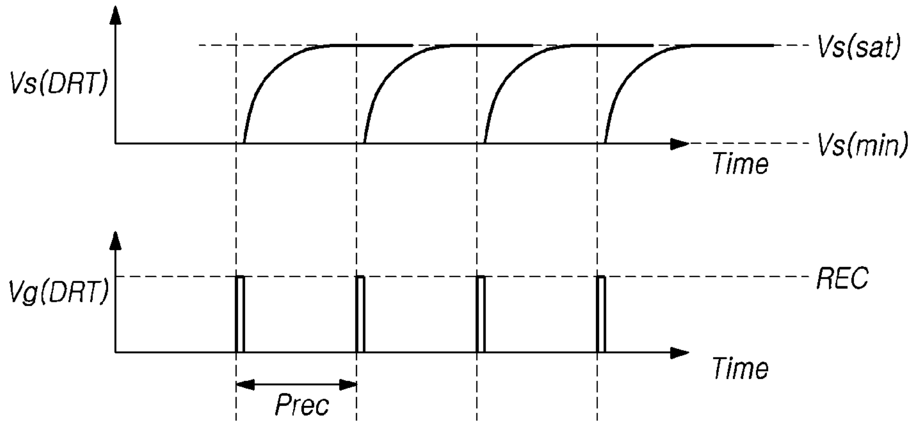
FIG. 12 is a diagram illustrating a reference period of a recovery voltage repeatedly applied to a vertical blank period in a display device according to embodiments of the present disclosure.

FIG. 12 is a diagram illustrating a reference period of a recovery voltage repeatedly applied to a vertical blank period in a display device according to embodiments of the present disclosure.

Referring to FIG. 12, in the display device 100 according to embodiments of the present disclosure, the reference period Prec of the recovery voltage REC repeatedly applied within the vertical blank period Vblank may be determined by reflecting the operating characteristics of the driving transistor DRT.

For example, in a circuit of the subpixel SP of FIG. 3, the recovery voltage REC may be applied to a gate node of the driving transistor DRT in a state in which the switching transistor SWT is turned on by the scan signal SCAN.

At this time, since the driving transistor DRT is in a turn-off state before the recovery voltage REC is applied to the driving transistor DRT, the source node voltage Vs(DRT) of the driving transistor DRT may be a level of the minimum voltage Vs(min) corresponding to the turn-off state.

When the recovery voltage REC is applied, the gate node voltage Vg(DRT) of the driving transistor DRT represents the level of the recovery voltage REC, and the driving transistor DRT is turned on.

When the driving transistor DRT is turned on, the source node voltage Vs(DRT) of the driving transistor DRT rises and enters into a saturation state after a certain period from it. In this case, a period from a time when the driving transistor DRT is turned on to a time when it reaches the saturation state may represent a characteristic of the driving transistor DRT.

Therefore, in order to uniformly reflect the characteristic of the driving transistor DRT, the reference period Prec in which the recovery voltage REC is repeatedly applied is determined based on a time interval between a time when the driving transistor DRT is turned on and a time when the driving transistor DRT is entered into the saturation state according to one embodiment. Thus, the timing at which the recovery voltage REC is applied a plurality of times during a blank period is based on an amount of time for the driving transistor to enter a saturation state from when the driving transistor is turned on.

For the above purpose, the reference period Prec of the recovery voltage REC may be stored in a memory to reflect the characteristic of the driving transistor DRT disposed on the display panel 110, and the recovery voltage REC may be repeatedly applied during the vertical blank period Vblank by referring to the memory.

At this time, the reference period Prec of the recovery voltage REC may vary according to the level of the recovery voltage REC applied to the driving transistor DRT within the vertical blank period Vblank. In this case, the reference period Prec corresponding to the level of the recovery voltage REC may be stored in the memory in the form of a look-up table, and the time interval at which the recovery voltage REC is repeatedly applied may be controlled by extracting the reference period Prec corresponding to the level of the recovery voltage REC applied within the vertical blank period Vblank from the memory.

Meanwhile, the timing controller 140 of the display device 100 of the present disclosure may receive a data enable signal DE supplied from an external host system, and generate a source output enable signal SOE for controlling a timing of the data driving circuit 130 using the received data enable signal DE.

During this process, a certain delay time may occur between the data enable signal DE transmitted to the timing controller 140 and the source output enable signal SOE generated by the timing controller 140. Due to this delay time, a deviation may occur in the floating time interval Tf between the time at which the recovery voltage REC is applied and the time at which the data voltage Vdata is applied.

The display device 100 of the present disclosure may reduce the deviation of the floating time interval Tf between the time at which the recovery voltage REC is applied and the time at which the data voltage Vdata is applied, and improve image quality by applying the recovery voltage REC in consideration of the delay time between the data enable signal DE and the source output enable signal SOE.

Figure 13:
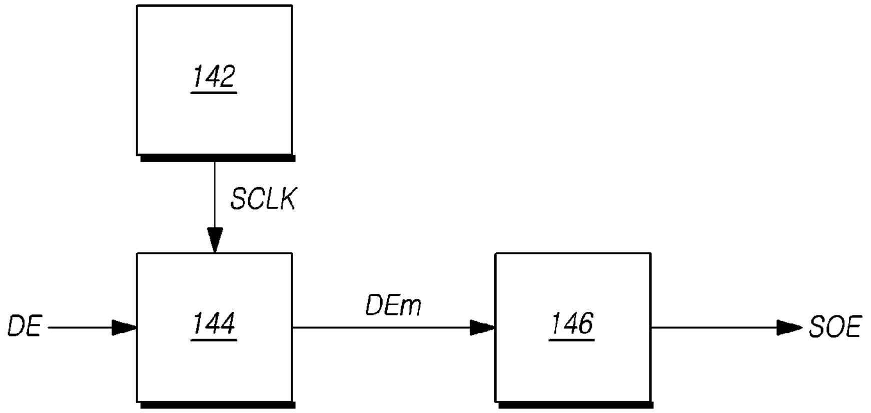
FIG. 13 is an exemplary block diagram of a circuit for generating a source output enable signal in a display device according to embodiments of the present disclosure.
Figure 14:
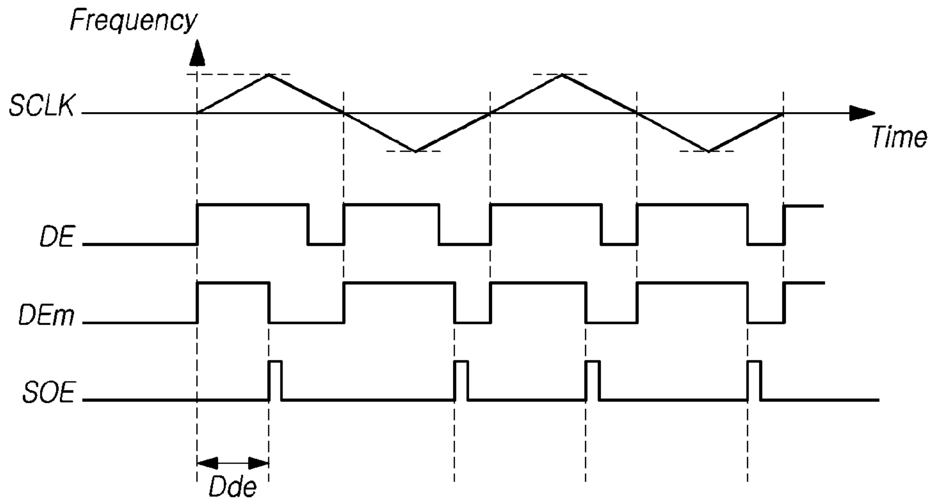
FIG. 14 is a diagram illustrating a signal flow in which a source output enable signal is generated in a display device according to embodiments of the present disclosure.

FIG. 13 is an exemplary block diagram of a circuit for generating a source output enable signal in a display device according to embodiments of the present disclosure, and FIG. 14 is a diagram illustrating a signal flow in which a source output enable signal is generated in a display device according to embodiments of the present disclosure.

Referring to FIGS. 13 and 14, the timing controller 140 of the display device 100 according to embodiments of the present disclosure may include a source sampling clock generation circuit 142, a modulation circuit 144, and a source output enable signal generation circuit 146.

The modulation circuit 144 may receive the data enable signal DE from the host system, and generate the modulated data enable signal DEm by modulating the received data enable signal DE. In this case, the modulation process of the data enable signal DE may be performed by using the source sampling clock SCLK.

The source sampling clock SCLK may be generated from the source sampling clock generation circuit 142. For example, the source sampling clock generation circuit 142 may generate the source sampling clock SCLK by spreading the frequency of a clock having a fixed frequency according to a spread spectrum method.

The source sampling clock SCLK may be formed in various shapes such as a triangular wave or a sine wave over time. Here, it shows a source sampling clock SCLK of triangular wave as an example.

The source sampling clock generation circuit 142 and the modulation circuit 144 may be located inside or outside the timing controller 140. Here, it is assumed that the source sampling clock generation circuit 142 and the modulation circuit 144 are located inside the timing controller 140.

The source sampling clock SCLK generated by the source sampling clock generation circuit 142 is transmitted to the modulation circuit 144, and the modulation circuit 144 modulates a data enable signal DE by using the source sampling clock SCLK.

For example, while the frequency of the source sampling clock SCLK is higher than a reference frequency, the frequency of the internal clock is increased to lead the falling edge of the data enable signal DE forward. Also, while the frequency of the source sampling clock SCLK is lower than the reference frequency, the frequency of the internal clock is decreased to lag the falling edge of the data enable signal DE.

As described above, the modulation circuit 144 may generate the modulated data enable signal DEm by controlling the timing of the data enable signal DE according to the change in the frequency of the source sampling clock SCLK.

The modulated data enable signal DEm is transmitted to the source output enable signal generation circuit 146. The source output enable signal generation circuit 146 may generate the source output enable signal SOE synchronized with the falling edge of the modulated data enable signal DEm.

In this process, a certain delay time Dde is exist between the source output enable signal SOE generated from the timing controller 140 and the data enable signal DE applied to the timing controller 140.

Since the delay time Dde may vary depending on the circuit structure and algorithm for generating the source output enable signal SOE in the timing controller 140, it may have different values depending on the structure of the display device 100 and the timing controller 140.

However, once the timing controller 140 is mounted on the display device 100, the value of the delay time Dde is fixed. Accordingly, it is possible to control the time to apply the recovery voltage REC by storing information on the delay time Dde of the data enable signal DE in a memory and reflecting it.

Figure 15:
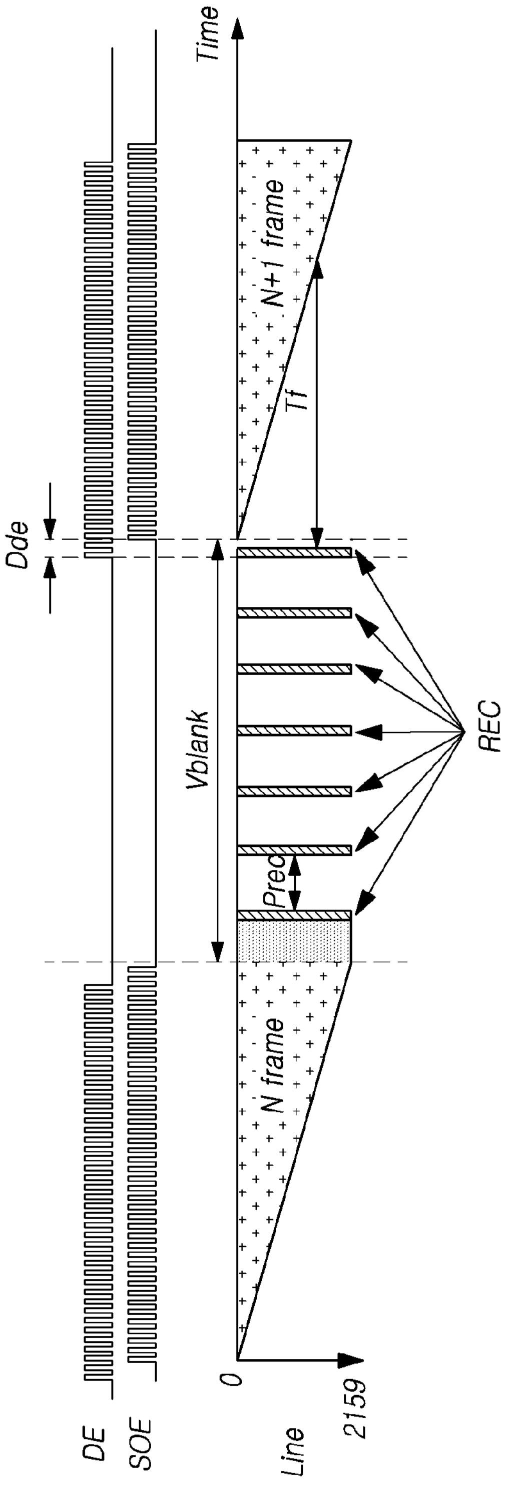
FIG. 15 is a diagram illustrating a signal flow for applying a recovery voltage in consideration of a delay time of a data enable signal and a source output enable signal in a display device according to embodiments of the present disclosure.

FIG. 15 is a diagram illustrating a signal flow for applying a recovery voltage in consideration of a delay time of a data enable signal and a source output enable signal in a display device according to embodiments of the present disclosure.

Referring to FIG. 15, the display device 100 according to embodiments may sense and compensate mobility among the characteristic values of the driving transistor DRT by selecting an arbitrary subpixel SP within a vertical blank period Vblank, and may repeatedly apply recovery voltages REC with a reference period Prec.

Here, the recovery period RECOVERY in which the recovery voltages REC are repeatedly applied may correspond to a certain period before the data voltage Vdata is applied to the corresponding subpixel SP after the mobility sensing period u SENSING of the driving transistor DRT is completed.

At this time, the recovery voltage REC is repeatedly applied to the corresponding subpixel SP until it approaches the end of the vertical blank period Vblank. Therefore, even if the length of the vertical blank period Vblank changes due to the change in the driving frequency of the display device 100, the floating time interval Tf between the time at which the recovery voltage REC is finally applied and the time at which the data voltage Vdata is applied in the vertical blank period Vblank may be kept constant.

As a result, even if the driving frequency of the display device 100 is changed, image errors due to luminance deviation may be reduced since the floating time interval Tf for each subpixel SP is maintained constant.

Meanwhile, the source output enable signal SOE applied from the timing controller 140 to the data driving circuit 130 may have a certain delay time Dde according to the internal circuit and algorithm of the timing controller 140 for processing the data enable signal DE.

Accordingly, the vertical blank period Vblank may be extended (e.g., increased) due to the delay time Dde of the data enable signal DE. As a result, the floating time interval Tf between the time at which the recovery voltage REC is applied and the time at which the data voltage Vdata is applied may vary.

However, when the time at which the recovery voltage REC is repeatedly applied according to the reference period Prec is within the range of the delay time Dde of the data enable signal DE, the display device 100 of the present disclosure may additionally apply the recovery voltage REC within the delay time Dde of the data enable signal DE. That is, the recovery voltage REC may be applied to a portion of the extended blank period that corresponds to the delay time Dde responsive to a timing at which to apply the recovery voltage REC is within the portion of the extended blank period.

As a result, even when there is a delay time Dde for the data enable signal DE, it is possible to reduce image errors and improve image quality by uniformly maintaining the floating time interval Tf between the time at which the recovery voltage REC is applied and the time at which the data voltage Vdata is applied.

Figure 16:
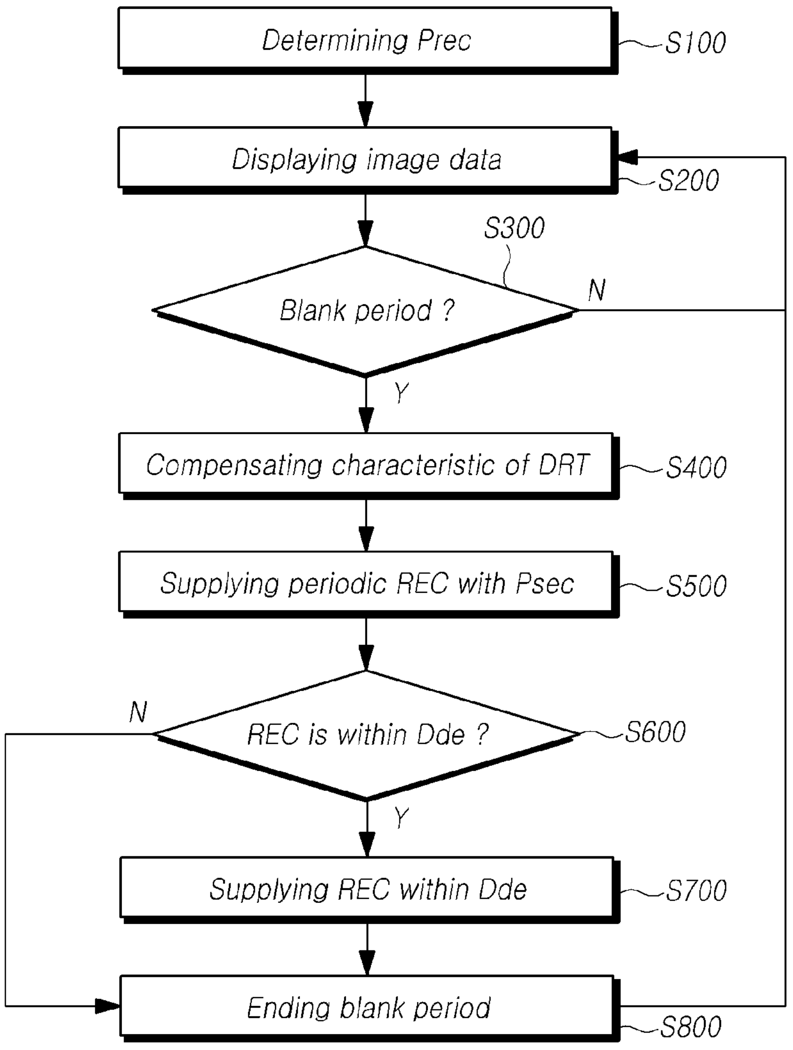
FIG. 16 is a flowchart illustrating a display driving method according to embodiments of the present disclosure.

FIG. 16 is a flowchart illustrating a display driving method according to embodiments of the present disclosure.

Referring to FIG. 16, a display driving method according to embodiments of the present disclosure may include a step S100 of determining a reference period Prec of a recovery voltage REC, a step S200 of displaying an image on a display panel 110, a step S300 of determining a blank period, a step S400 of compensating for the characteristic value of a driving transistor DRT within the blank period, a step S500 of repeatedly applying the recovery voltage REC at intervals of the reference period Prec, a step S600 of determining whether a time at which the recovery voltage REC is applied is within a delay time Dde of a data enable signal DE, a step S700 of applying the recovery voltage REC within delay time Dde of the data enable signal DE, and a step S800 of terminating the blank period.

The step S100 of determining a reference period Prec of a recovery voltage REC is a process of determining the cycle of repeatedly applying the recovery voltage REC to a gate node of the driving transistor DRT after a process of compensating the characteristic value of the driving transistor DRT is completed in the blank period.

The reference period Prec of the recovery voltage REC may be determined as a time interval between a time when the driving transistor DRT is turned on and a time when the driving transistor DRT is entered into the saturation state. The reference period Prec of the recovery voltage REC may be stored in the memory at the time of shipment of the display device 100.

The step S200 of displaying an image on a display panel 110 is a process of displaying image by applying image data DATA transmitted from the host system to the display panel 110 after power is applied to the display device 100.

The step S300 of determining a blank period is a process of determining whether it is a horizontal blank period or a vertical blank period in which an image is not displayed on the display panel 110.

The step S400 of compensating for the characteristic value of a driving transistor DRT within the blank period is a process of sensing and compensating for the threshold voltage or mobility of the driving transistor DRT in the blank period.

The step S500 of repeatedly applying the recovery voltage REC at intervals of the reference period Prec is a process of repeatedly applying the recovery voltage REC at intervals of the reference period Prec after the process of compensating for the characteristic value of the driving transistor DRT is completed within the blank period.

The step S600 of determining whether a time at which the recovery voltage REC is applied is within a delay time Dde of a data enable signal DE is a process of determining whether the time at which the recovery voltage REC is repeatedly applied based on the reference period Prec corresponds to an extended blank period due to the delay time Dde between the data enable signal DE and the source output enable signal SOE.

The step S700 of applying the recovery voltage REC within delay time Dde of the data enable signal DE is a process of applying the recovery voltage REC within the delay time Dde of the data enable signal DE when the time at which the recovery voltage REC is applied is included within the delay time Dde of the data enable signal DE.

If the time at which the recovery voltage REC is applied is not included within the delay time Dde of the data enable signal DE, the process of applying the recovery voltage REC to the corresponding blank period may be terminated by applying the recovery voltage REC before the delay time Dde of the data enable signal DE.

The step S800 of terminating the blank period is a process of displaying the image on the display panel 110 after terminating the process of applying the recovery voltage REC.

The following is a brief description of the above-described embodiments of the present disclosure.

The display device of the present disclosure may include a display panel including a plurality of gate lines, a plurality of data lines, and a plurality of subpixels in which a driving transistor are disposed, a gate driving circuit configured to apply scan signal to the plurality of gate lines, a data driving circuit configured to convert image data into a data voltage and apply the data voltage to the plurality of data lines, and a timing controller configured to compensate for a characteristic value of the driving transistor by using a real-time sensing process, and control to repeatedly apply a recovery voltage for resetting the driving transistor based on a reference period within a blank period.

The reference period may be determined as a time interval between a time when the driving transistor is turned on and a time when the driving transistor is entered into a saturation state.

The reference period may be determined to correspond to a level of the recovery voltage and stored in a memory in the form of a look-up table.

The characteristic value of the driving transistor may be mobility, and the blank period may be a vertical blank period.

The blank period may have a time interval which varies according to driving frequency.

The timing controller may include a source sampling clock generation circuit configured to generate a source sampling clock for controlling data sampling timing, a modulation circuit configured to modulate a data enable signal by using the source sampling clock, and a source output enable signal generation circuit configured to generate a source output enable signal synchronized with a modulated data enable signal to control output timing of the data drive circuit.

The blank period may be extended by the delay time as the source output enable signal is transmitted after a predetermined time has delayed from the data enable signal.

Information of the delay time may be stored in a memory in advance.

The timing controller may be controlled to apply the recovery voltage within the delay time when a time at which the recovery voltage is applied is within a range of the delay time.

Also, the display driving method of the present disclosure of a display device including a display panel including a plurality of gate lines, a plurality of data lines, and a plurality of subpixels in which a driving transistor are disposed, a gate driving circuit configured to apply scan signal to the plurality of gate lines, and a data driving circuit configured to convert image data into a data voltage and apply the data voltage to the plurality of data lines, the display driving method may be comprised of a step of determining a reference period of a recovery voltage for resetting the driving transistor, a step of displaying an image on the display panel, a step of compensating for a characteristic value of the driving transistor within a blank period, and a step of repeatedly applying the recovery voltage at an interval of the reference period within the blank period.

The display driving method may be further comprised of a step of generating a source sampling clock for controlling a data sampling timing, a step of modulating a data enable signal received from outside by using the source sampling clock, and a step of generating a source output enable signal synchronized with a modulated data enable signal to control an output timing of the data driving circuit, wherein the source output enable signal is transmitted after a delay time from a time at which the data enable signal is applied, and the blank period is extended by the delay time.

The display driving method may be further comprised of a step of applying the recovery voltage within the delay time when a time at which the recovery voltage is applied is included in the delay time.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure.

What is claimed is:

1. A display device comprising:

a display panel including a plurality of gate lines, a plurality of data lines, and a plurality of subpixels including a plurality of driving transistors;

a gate driving circuit configured to apply scan signals to the plurality of gate lines;

a data driving circuit configured to convert image data into data voltages and apply the data voltages to the plurality of data lines; and a timing controller configured to compensate the data voltages applied to the plurality of driving transistors based on a real-time sensing process of characteristic values of the plurality of driving transistors, and control an application of a recovery voltage to at least one driving transistor of the plurality of driving transistors a plurality of times within a blank period of a frame period based on a reference period to reset the at least one driving transistor during the blank period, the frame period including a display driving period during which the data voltages are applied and the blank period during which the data voltages are maintained.

2. The display device of claim 1, wherein the reference period is determined based on a time interval between a time when the at least one driving transistor is turned on during the display driving period and a time when the driving transistor enters into a saturation state during the display driving period.

3. The display device of claim 2, wherein the reference period corresponds to a level of the recovery voltage and is stored in a memory.

4. The display device of claim 1, wherein the characteristic value of the at least one driving transistor is a mobility of the at least one driving transistor, and the blank period is a vertical blank period.

5. The display device of claim 1, wherein a length of the blank period is based on a selected driving frequency of the display device from a plurality of different driving frequencies.

6. The display device of claim 1, wherein the timing controller includes:

a source sampling clock generation circuit configured to generate a source sampling clock that controls data sampling timing at which the data voltages are sampled;

a modulation circuit configured to modulate a data enable signal using the source sampling clock, the data enable signal indicative of a timing at which the plurality of data voltages are applied; and a source output enable signal generation circuit configured to generate a source output enable signal synchronized with the modulated data enable signal, the source output enable signal controlling output timing of the data drive circuit.

7. The display device of claim 6, wherein the blank period is extended by a delay time that corresponds to an amount of time between transmission of the source output enable signal and transmission of the data enable signal, the source output enable signal outputted after the data enable signal.

8. The display device of claim 7, wherein the delay time is stored in a memory.

9. The display device of claim 7, wherein the timing controller is controlled to apply the recovery voltage within a portion of the extended blank period that corresponds to the delay time responsive to a timing at which the recovery voltage is applied is within the portion of the extended blank period.

10. A display driving method of a display device including a display panel including a plurality of gate lines, a plurality of data lines, and a plurality of subpixels including a plurality of driving transistors, a gate driving circuit configured to apply scan signals to the plurality of gate lines, and a data driving circuit configured to convert image data into a data voltages and apply the data voltages to the plurality of data lines, the display driving method comprising:

determining a reference period of a recovery voltage, the reference period indicative of a timing which the recovery voltage is applied to at least one driving transistor of the plurality of driving transistors to reset the at least one driving transistor;

displaying an image on the display panel;

compensating the data voltages applied to the plurality of driving transistors based on sensed characteristic values of the plurality of driving transistors within a blank period of a frame period, the frame period including a display driving period during which the data voltages are applied and the blank period during which the data voltages are maintained; and applying the recovery voltage to the at least one driving transistor a plurality of times within the blank period based on the reference period.

11. The display driving method of claim 10, wherein the reference period is determined based on a time interval between a time when the driving transistor is turned on during the display driving period and a time when the driving transistor enters into a saturation state during the display driving period.

12. The display driving method of claim 11, wherein the reference period corresponds to a level of the recovery voltage and stored in a memory.

13. The display driving method of claim 10, wherein a length of the blank period is based on a selected driving frequency of the display device from a plurality of different driving frequencies.

14. The display driving method of claim 10, further comprising:

generating a source sampling clock that controls a data sampling timing at which the data voltages are sampled;

modulating a data enable signal using the source sampling clock, the data enable signal indicative of a timing at which the plurality of data voltages are applied; and generating a source output enable signal synchronized with the modulated data enable signal, the source output enable signal controlling an output timing of the data driving circuit;

wherein the source output enable signal is transmitted after the data enable signal is transmitted, and the blank period is extended by a delay time between the transmission of the data enable signal and the source output enable signal.

15. The display driving method of claim 14, further comprising:

applying the recovery voltage within a portion of the extended blank period that corresponds to the delay time responsive to a timing at which the recovery voltage is applied is within the portion of the extended blank period.

16. A display device comprising:

a display panel including a plurality of subpixels, a plurality of gate lines, a plurality of data lines, and a plurality of driving transistors each included in a corresponding subpixel from the plurality of subpixels;

a data driving circuit configured to convert image data into data voltages and apply the data voltages to the plurality of data lines during a display driving period of a frame period that includes the display driving period and a blank period during which the data voltages are maintained;

a timing controller configured to switch operation of the display device between a first driving frequency and a second driving frequency that is different from the first driving frequency, wherein a recovery voltage is applied to at least one driving transistor of the plurality of driving transistors a first plurality of times according to a predetermined timing during a first blank period of a first frame period that corresponds to the first driving frequency, and wherein the recovery voltage is applied to the at least one driving transistor a second plurality of times according to the predetermined timing during a second blank period of a second frame period that corresponds to the second driving frequency where the second blank period has a duration that is different from the first blank period.

17. The display device of claim 16, wherein a number of times the recovery voltage is applied to the at least one driving transistor during the first blank period is different from a number of times the recovery voltage is applied to the at least one driving transistor during the second blank period.

18. The display device of claim 16, wherein the predetermined timing is based on an amount of time for the at least one driving transistor to enter a saturation state from when the at least one driving transistor is turned on.

19. The display device of claim 16, wherein an amount of time from when a last recovery voltage from the first plurality of times in which the recovery voltage is applied during the first blank period to a time when first data voltages are applied during a first display driving period of the first frame period is a same as an amount of time from when a last recovery voltage from the second plurality of times in which the recovery voltage is applied during the second blank period to a time when second data voltages are applied during a second display driving period of the second frame period.

20. The display device of claim 16, wherein the timing controller is configured to compensate the data voltages applied to the plurality of driving transistors based on a sensing process of characteristic values of the plurality of driving transistors, the sensing process performed during the first blank period prior to the application of the recovery voltage during the first blank period and during the second blank period prior to the application of the recovery voltage during the second blank period.

* * * * *